United States Patent
Yang et al.

(10) Patent No.: US 11,012,505 B2
(45) Date of Patent: May 18, 2021

(54) APPLICATION INFORMATION SHARING METHOD AND APPARATUS

(71) Applicant: Huawei Technologies Co., Ltd., Shenzhen (CN)

(72) Inventors: Fen Yang, Nanjing (CN); Zijun Li, Shenzhen (CN); Zhandong Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 132 days.

(21) Appl. No.: 15/293,456

(22) Filed: Oct. 14, 2016

(65) Prior Publication Data

US 2017/0034264 A1   Feb. 2, 2017

Related U.S. Application Data

(63) Continuation of application No. PCT/CN2014/075386, filed on Apr. 15, 2014.

(51) Int. Cl.
*G06F 15/16* (2006.01)
*H04L 29/08* (2006.01)
(Continued)

(52) U.S. Cl.
CPC .... *H04L 67/1095* (2013.01); *H04M 1/72406* (2021.01); *H04M 1/72412* (2021.01);
(Continued)

(58) Field of Classification Search
CPC .... H04L 67/1095; H04W 76/14; H04W 4/80; H04M 1/72525; H04M 1/7253
(Continued)

(56) References Cited

U.S. PATENT DOCUMENTS 9,244,993 B1\* 1/2016 Adoc, Jr. .......... G06F 17/30575
2003/0084439 A1\* 5/2003 Perkins ..................... G06F 8/61
717/177
(Continued)

FOREIGN PATENT DOCUMENTS

CN          1638338 A      7/2005
CN        101196912 A      6/2008
(Continued)

*Primary Examiner* — Kaylee J Huang
(74) *Attorney, Agent, or Firm* — Slater Matsil, LLP

(57) ABSTRACT

Embodiments provide an application information sharing method and apparatus. The application information sharing method of embodiments includes receiving, by a second terminal by using Near Field Communication, application information sent by a first terminal, where the application information includes identification information of an application and status information of the application and parsing the application information to obtain the identification information of the application and the status information of the application. The method also includes performing a query on the second terminal according to the identification information of the application, and in a case in which it is found that the application is installed in the second terminal, synchronizing, according to the status information of the application, status information of the application in the second terminal with the status information of the application in the first terminal.

14 Claims, 22 Drawing Sheets

(51) Int. Cl.
*H04W 76/14* (2018.01)
*H04W 4/80* (2018.01)
*H04M 1/72406* (2021.01)
*H04M 1/72412* (2021.01)
*H04M 1/2757* (2020.01)

(52) U.S. Cl.
CPC ............ *H04W 4/80* (2018.02); *H04W 76/14* (2018.02); *H04M 1/2757* (2020.01); *H04M 2250/04* (2013.01); *H04M 2250/64* (2013.01)

(58) Field of Classification Search
USPC ........................................ 709/204, 230, 248
See application file for complete search history.

(56) References Cited

U.S. PATENT DOCUMENTS

| | | | | |
|---|---|---|---|---|
| 2003/0115302 | A1* | 6/2003 | Teraoaka | G06F 16/10 709/221 |
| 2006/0168574 | A1* | 7/2006 | Giannini | G06F 8/65 717/168 |
| 2008/0134211 | A1 | 6/2008 | Cui | |
| 2008/0320150 | A1 | 12/2008 | Boehringer et al. | |
| 2009/0007260 | A1* | 1/2009 | Winje | G06F 21/604 726/21 |
| 2010/0235518 | A1* | 9/2010 | Holden | G06F 13/385 709/227 |
| 2011/0119233 | A1* | 5/2011 | Reddy | H01L 21/31116 707/624 |
| 2013/0014006 | A1* | 1/2013 | Abellera | G06F 3/0482 715/234 |
| 2013/0066832 | A1* | 3/2013 | Sheehan | G06Q 10/00 707/634 |
| 2013/0198304 | A1 | 8/2013 | Jung | |
| 2013/0318158 | A1* | 11/2013 | Teng | H04L 67/42 709/203 |
| 2014/0080469 | A1 | 3/2014 | Ko et al. | |
| 2014/0095625 | A1* | 4/2014 | Quan | G06F 17/30575 709/205 |
| 2014/0289333 | A1* | 9/2014 | Chan | A63F 13/12 709/204 |
| 2015/0154224 | A1* | 6/2015 | Cui | G06F 9/52 707/620 |
| 2016/0007141 | A1* | 1/2016 | Anantharangachar | H04W 4/80 709/219 |
| 2016/0212188 | A1* | 7/2016 | Yao | H04L 51/043 |

FOREIGN PATENT DOCUMENTS

| | | | | |
|---|---|---|---|---|
| CN | 102546779 A | 7/2012 | | |
| CN | 102932439 A | 2/2013 | | |
| CN | 103118171 A | 5/2013 | | |
| CN | 103677257 A | 3/2014 | | |
| CN | 103716390 A | 4/2014 | | |
| EP | 2648427 A1 * | 10/2013 | ........... H04B 5/0031 |
| EP | 2648427 A1 | 10/2013 | | |
| EP | 2706767 A1 | 3/2014 | | |

\* cited by examiner

| Contacts |
|---|
| Contact A |
| Contact B |
| Contact C |
| Contact D |
| ... |
| |

FIG. 6D

| Detailed information of contacts |
|---|
| Contact C |
| TEL: 137****0000 |
| Email: **@sina.com |
| |

FIG. 6E

Detailed information of contacts

Contact C

TEL: 137****0000

Email: **@sina.com

FIG. 6H

| Notepad | + |
|---|---|
| Reminder 1 | November 1 |
| Reminder 2 | November 8 |
| Reminder 3 | November 12 |

FIG. 7D

| Reminder 1 |
|---|
| Detailed content of the reminder 1 |

FIG. 7E

| Notepad | + |
|---|---|
| Reminder 1 in a second terminal | October 1 |
| Reminder 2 in the second terminal | October 8 |
| Reminder 1 | November 1 |

APPLICATION INFORMATION SHARING METHOD AND APPARATUS

CROSS-REFERENCE TO RELATED APPLICATIONS

This application is a continuation application of International Patent Application No. PCT/CN2014/075386, filed on Apr. 15, 2014, the disclosure of which is hereby incorporated by reference in its entirety.

TECHNICAL FIELD

Embodiments relate to communications technologies, and in particular, to an application information sharing method and apparatus.

BACKGROUND

As network communications technologies and multimedia technologies develop, people use intelligent terminal devices such as a smart television, a smartphone, and a tablet computer more widely, and expect to share application information among different intelligent terminal devices, so as to implement multi-screen interaction among the different intelligent terminal devices.

In the prior art, when a user of a first terminal needs to share, with a second terminal, status information of an application in the terminal device, the user usually needs to determine, by searching, whether the application is installed in the second terminal. If the application is not installed, the user needs to manually add the application to the second terminal and then needs to further explore whether the application has a function of sharing the status information of the application. In a case in which the application can implement sharing of the status information of the application, the user manually starts, in the application, the function of sharing the status information of the application, so as to implement sharing, by the second terminal, the status information of the application in the first terminal.

However, an entire process of implementing sharing of status information of an application includes more steps that involve manual operations, which is cumbersome and time-consuming. In addition, after the application is added, the user further needs to explore whether the application has the function of sharing the status information of the application. If the application cannot implement the function of sharing the status information of the application, the second terminal cannot share the status information of the application in the first terminal. For example, if applications installed in the first terminal include Tencent Video Player and iQIYI Video Player, and applications installed in the second terminal also include Tencent Video Player and iQIYI Video Player, and if an application started in the first terminal is Tencent Video Player, the second terminal needs to remember that Tencent Video Player supports sharing, and starts Tencent Video Player, so as to share a shared file provided by the first terminal. In addition, versions of Tencent Video Player in the first terminal and the second terminal may be different, and therefore Tencent Video Player in the second terminal may have no capability of sharing a video; therefore, the method has a limitation.

SUMMARY

Embodiments provide an application information sharing method and apparatus, so as to resolve a problem in the prior art that an entire process of implementing application information sharing includes more steps that involve manual operations, is cumbersome and time-consuming, and is limited to information sharing of a specific application.

According to a first aspect, an embodiment provides an application information sharing method, including receiving, by a second terminal by using Near Field Communication, application information sent by a first terminal, where the application information includes identification information of an application and status information of the application. The method also includes parsing, by the second terminal, the application information to obtain the identification information of the application and the status information of the application and performing, by the second terminal, a query on the second terminal according to the identification information of the application. Additionally, the method includes in a case in which it is found that the application is installed in the second terminal, synchronizing, by the second terminal according to the status information of the application, status information of the application in the second terminal with the status information of the application in the first terminal.

In a first possible implementation manner of the first aspect, the method further includes: in a case in which it is found that the application is not installed in the second terminal, installing, by the second terminal according to the identification information of the application, the application in the second terminal, and starting the application; and synchronizing, by the second terminal according to the status information of the application, status information of the application in the second terminal with the status information of the application in the first terminal.

According to the first aspect or the first possible implementation manner of the first aspect, in a second possible implementation manner, the synchronizing, by the second terminal according to the status information of the application, status information of the application in the second terminal with the status information of the application in the first terminal includes: synchronizing, by the second terminal according to the status information of the application, the status information of the application in the second terminal with the status information of the application in the first terminal in a manner of searching for a configuration file of the application and writing the status information of the application into the configuration file that is of the application and is found by the second terminal; or synchronizing, by the second terminal according to the status information of the application, the status information of the application in the second terminal with the status information of the application in the first terminal in a manner of writing the status information of the application into a database file of the second terminal.

According to the first aspect and either of the first and the second possible implementation manners of the first aspect, in a third possible implementation manner, the status information of the application is current running status information of the application.

According to the first aspect and any one of the first to the third possible implementation manners of the first aspect, in a fourth possible implementation manner, the identification information of the application is a name of the application, a serial number of the application, or a message digest algorithm md5 value of the application.

According to a second aspect, an embodiment provides an application information sharing method, including determining, by a first terminal on the first terminal, an application selected by a user from an application list of the first terminal and extracting, by the first terminal, identification information of the application and status information of the application according to the determined application. The method also includes sending, by the first terminal, application information to a second terminal by using Near Field Communication, where the application information includes the identification information of the application and the status information of the application, so that the second terminal determines, according to the identification information of the application, whether the application is installed in the second terminal, and in a case in which it is determined that the application is installed in the second terminal, the second terminal synchronizes, according to the status information of the application, status information of the application in the second terminal with the status information of the application in the first terminal.

In a first possible implementation manner of the second aspect, the extracting, by the first terminal, identification information of the application and status information of the application according to the determined application includes: extracting, by the first terminal, the identification information of the application and the status information of the application from a configuration file of the determined application or a database file.

According to the second aspect or the first possible implementation manner of the second aspect, in a second possible implementation manner, the status information of the application is current running status information of the application.

According to the second aspect, and either of the first and the second possible implementation manners of the second aspect, in a third possible implementation manner, the identification information of the application is a name of the application, a serial number of the application, or a message digest algorithm md5 value of the application.

According to a third aspect, an embodiment provides an application information sharing apparatus, including: a receiving module, configured to receive, by using Near Field Communication, application information sent by a first terminal, where the application information includes identification information of an application and status information of the application; a parsing module, configured to parse the application information to obtain the identification information of the application and the status information of the application; a querying module, configured to perform a query on the second terminal according to the identification information of the application; and a synchronizing module, configured to: in a case in which it is found that the application is installed in the second terminal, synchronize, according to the status information of the application, status information of the application in the second terminal with the status information of the application in the first terminal.

In a first possible implementation manner of the third aspect, the synchronizing module is further configured to: in a case in which it is found that the application is not installed in the second terminal, install the application in the second terminal according to the identification information of the application, and start the application; and synchronize, according to the status information of the application, the status information of the application in the second terminal with the status information of the application in the first terminal.

According to the third aspect or the first possible implementation manner of the third aspect, in a second possible implementation manner, the synchronizing module is specifically configured to synchronize, according to the status information of the application, the status information of the application in the second terminal with the status information of the application in the first terminal in a manner of searching for a configuration file of the application and writing the status information of the application into the configuration file that is of the application and is found by the second terminal; or specifically configured to synchronize, according to the status information of the application, the status information of the application in the second terminal with the status information of the application in the first terminal in a manner of writing the status information of the application into a database file of the second terminal.

According to a fourth aspect, an embodiment provides an application information sharing apparatus, including: a determining module, configured to determine, on a first terminal, an application selected by a user from an application list of the first terminal; an extracting module, configured to extract identification information of the application and status information of the application according to the determined application; and a sending module, configured to send application information to a second terminal by using Near Field Communication, where the application information includes the identification information of the application and the status information of the application, so that the second terminal determines, according to the identification information of the application, whether the application is installed in the second terminal, and in a case in which it is determined that the application is installed in the second terminal, the second terminal synchronizes, according to the status information of the application, status information of the application in the second terminal with the status information of the application in the first terminal.

In a first possible implementation manner of the fourth aspect, the extracting module is specifically configured to extract the identification information of the application and the status information of the application from a configuration file of the determined application or a database file.

According to a fifth aspect, an embodiment provides an application information sharing apparatus, including: a receiver, configured to receive, by using Near Field Communication, application information sent by a first terminal, where the application information includes identification information of an application and status information of the application; and a processor, configured to: parse the application information to obtain the identification information of the application and the status information of the application; perform a query on a second terminal according to the identification information of the application; and in a case in which it is found that the application is installed in the second terminal, synchronize, according to the status information of the application, status information of the application in the second terminal with the status information of the application in the first terminal.

In a first possible implementation manner of the fifth aspect, the processor is further configured to: in a case in which it is found that the application is not installed in the second terminal, install the application in the second terminal according to the identification information of the application, and start the application; and synchronize, according to the status information of the application, the status information of the application in the second terminal with the status information of the application in the first terminal.

According to the fifth aspect or the first possible implementation manner of the fifth aspect, in a second possible implementation manner, the processor is specifically configured to synchronize, according to the status information of the application, the status information of the application in the second terminal with the status information of the application in the first terminal in a manner of searching for a configuration file of the application and writing the status information of the application into the configuration file that is of the application and is found by the second terminal; or is specifically configured to synchronize, according to the status information of the application, the status information of the application in the second terminal with the status information of the application in the first terminal in a manner of writing the status information of the application into a database file of the second terminal.

According to a sixth aspect, an embodiment provides an application information sharing apparatus, including: a processor, configured to: determine, on a first terminal, an application selected by a user from an application list of the first terminal; and extract identification information of the application and status information of the application according to the determined application; and a transmitter, configured to send application information to a second terminal by using Near Field Communication, where the application information comprises the identification information of the application and the status information of the application, so that the second terminal determines, according to the identification information of the application, whether the application is installed in the second terminal, and in a case in which it is determined that the application is installed in the second terminal, the second terminal synchronizes, according to the status information of the application, status information of the application in the second terminal with the status information of the application in the first terminal.

In a first possible implementation manner of the sixth aspect, the processor is specifically configured to extract the identification information of the application and the status information of the application from a configuration file of the determined application or a database file.

According to the application information sharing method and apparatus provided in the embodiments, a second terminal receives, by using Near Field Communication, application information sent by a first terminal, parses the application information to obtain identification information of an application and status information of the application, performs a query on the second terminal according to the identification information of the application, and in a case in which it is found that the application is installed, synchronizes, according to the status information of the application, status information of the application in the second terminal with the status information of the application in the first terminal. Therefore, this resolves a problem in the prior art that an entire process of implementing application information sharing includes more steps that involve manual operations, is cumbersome and time-consuming, and has a limitation, thereby improving application information sharing efficiency.

BRIEF DESCRIPTION OF THE DRAWINGS

To describe the technical solutions in the embodiments more clearly, the following briefly introduces the accompanying drawings required for describing the embodiments or the prior art. Apparently, the accompanying drawings in the following description show merely some embodiments, and persons of ordinary skill in the art may still derive other drawings from these accompanying drawings without creative efforts.

FIG. 6D is a schematic diagram of an interface of Address Book information, displayed in a first terminal according to Embodiment 6;

FIG. 6E is a schematic diagram of an interface of detailed information of a contact C in a first terminal according to Embodiment 6;

FIG. 6H is a schematic diagram of an interface of information about a contact added by a second terminal according to Embodiment 6;

FIG. 7D is a schematic diagram of an interface of information, in Notepad, displayed in a first terminal according to Embodiment 7;

FIG. 7E is a schematic diagram of an interface of detailed information of a reminder 1 in a first terminal according to Embodiment 7;

DETAILED DESCRIPTION OF ILLUSTRATIVE EMBODIMENTS

To make the objectives, technical solutions, and advantages of the embodiments clearer, the following clearly and completely describes the technical solutions in the embodiments with reference to the accompanying drawings in the embodiments. Apparently, the described embodiments are some but not all of the embodiments. All other embodiments obtained by persons of ordinary skill in the art based on the embodiments without creative efforts shall fall within the protection scope.

Figure 1:
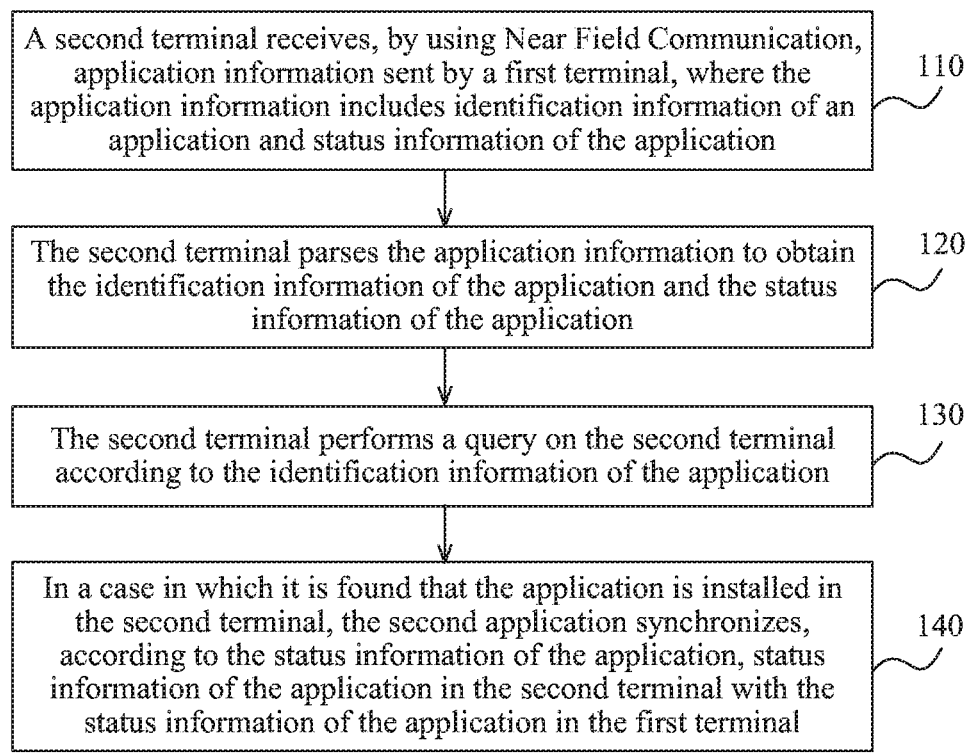
FIG. 1 is a flowchart of an application information sharing method according to Embodiment 1.

FIG. 1 is a flowchart of an application information sharing method according to Embodiment 1. The method in this embodiment is applicable to a case of unified management performed on sharing of information about different applications on a premise that application information sharing efficiency is improved. The method is executed by a second terminal, and an apparatus is implemented in a hardware and/or software manner. The method in this embodiment includes the following steps.

110. The second terminal receives, by using Near Field Communication, application information sent by a first terminal, where the application information includes identification information of an application and status information of the application.

The identification information can uniquely identify an application, so that the second terminal finds the application according to the identification information.

120. The second terminal parses the application information to obtain the identification information of the application and the status information of the application.

130. The second terminal performs a query on the second terminal according to the identification information of the application.

In the prior art, manual search is conducted to determine whether the application is installed in the second terminal, and a manual operation wastes time and labor. In step 130 in this embodiment, the second terminal performs a query on the second terminal according to the identification information of the application, to determine whether the application is installed in the second terminal; therefore, a cumbersome process with a manual operation is reduced, which may reduce time required for sharing application information, and improve application information sharing efficiency.

Step 140. In a case in which it is found that the application is installed in the second terminal, the second terminal synchronizes, according to the status information of the application, status information of the application in the second terminal with the status information of the application in the first terminal.

In the prior art, after the application is manually found, whether the application has a function of sharing the application information needs to be further determined. The application information can be shared between terminals only in a case in which the application can implement application information sharing, and therefore the method has a limitation. In 140 in this embodiment, after it is determined that the application is installed in the second terminal, currently displayed information of the application in the second terminal may be adjusted according to the status information that is of the application and is obtained by parsing. Whether the application has a function of sharing the status information of the application does not need to be determined, and a case in which the second terminal cannot share the status information of the application because of different versions of the application installed in the first terminal and the second terminal does not exist. Therefore, unified management on application information sharing may be implemented. As long as some applications exist in the second terminal, sharing of application information of these applications may be implemented. For example, if two applications Address Book and Video Player exist in a sharing function list of the second terminal, and if the first terminal needs to share information about a contact A in Address Book, as long as Address Book is installed in the second terminal, the information about the contact A can be shared on the second terminal. The information about the contact A is shared without determining whether Address Book in the second terminal supports a sharing function. As long as the second terminal acquires the information about the contact A, the second terminal can synchronize, according to the acquired information about the contact A, status information of Address Book in the second terminal with status information of Address Book in the first terminal. For example, before synchronization, the second terminal cannot share the information about the contact A, and after adjustment, the status information of Address Book in the second terminal is the information about the contact A. Alternatively, if the first terminal needs to share a movie played in Video Player, as long as Video Player is installed in the second terminal, the movie can be shared in the second terminal. The movie is shared without determining whether Video Player in the second terminal supports a sharing function.

Specifically, the second terminal receives, by using Near Field Communication, the application information sent by the first terminal; parses the application information to obtain the identification information of the application and the status information of the application; performs a query on the second terminal according to the identification information of the application; and in a case in which it is found that the application is installed, synchronizes, according to the status information of the application, the status information of the application in the second terminal with the status information of the application in the first terminal.

According to the application information sharing method provided in this embodiment, a second terminal receives, by using Near Field Communication, application information sent by a first terminal; parses the application information to obtain identification information of an application and status information of the application; performs a query on the second terminal according to the identification information of the application; and in a case in which it is found that the application is installed, synchronizes, according to the status information of the application, status information of the application in the second terminal with the status information of the application in the first terminal. This resolves a problem in the prior art that an entire process of implementing application information sharing includes more steps that involve manual operations, is cumbersome and time-consuming, and has a limitation, thereby improving application information sharing efficiency.

Figure 2:
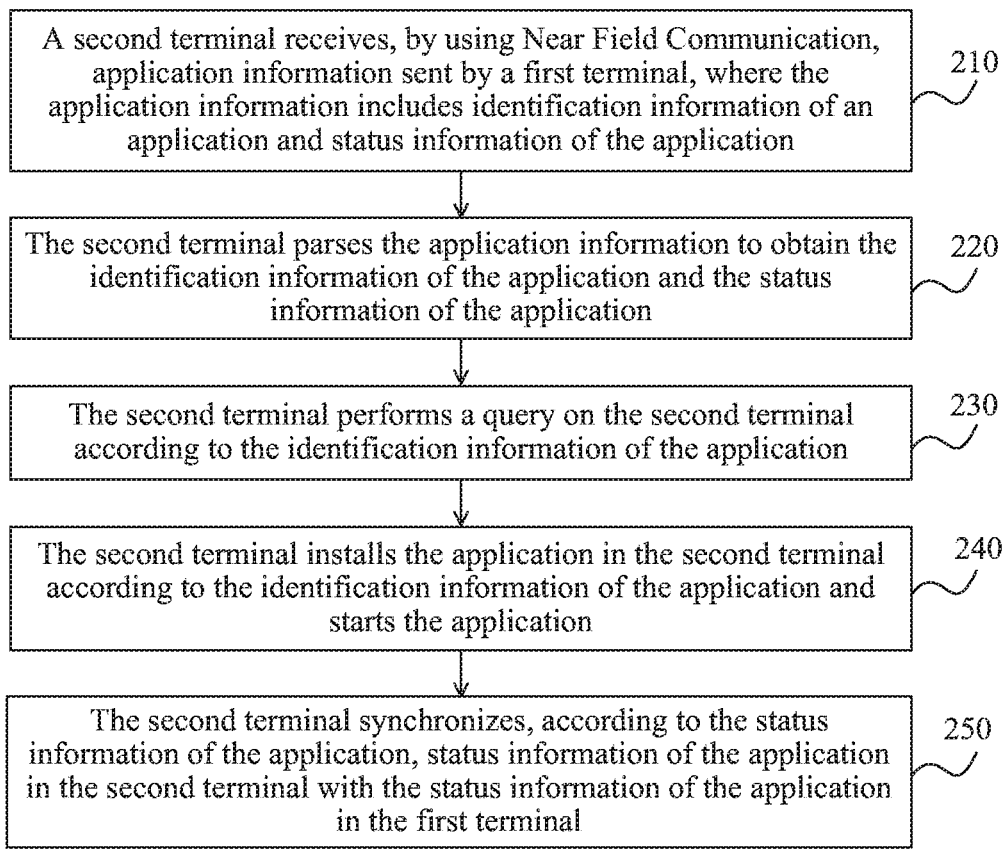
FIG. 2 is a flowchart of an application information sharing method according to Embodiment 2.

FIG. 2 is a flowchart of an application information sharing method according to Embodiment 2. With reference to FIG. 2, the method in this embodiment may include the following steps.

210. A second terminal receives, by using Near Field Communication, application information sent by a first terminal, where the application information includes identification information of an application and status information of the application.

The status information of the application is current running status information of the application. For example, if the application is Notepad, the current running status information of the application is currently recorded text information of Notepad; if the application is Address Book, the current running status information of the application is current information about a contact; if the application is a browser, the current running status information of the application is current web page link information of the browser; if the application is a player, the current running status information of the application is a currently played file and play progress information of the file. The identification information of the application may be a name of the application, a serial number of the application, or a message digest algorithm 5 (md5) value of the application.

220. The second terminal parses the application information to obtain the identification information of the application and the status information of the application.

230. The second terminal performs a query on the second terminal according to the identification information of the application.

It should be noted that the second terminal performs a query in the second terminal according to the identification information of the application, so as to determine whether the application is installed in the second terminal, and in a case in which it is found that the application is installed in the second terminal, the second terminal synchronizes, according to the status information of the application, status information of the application in the second terminal with the status information of the application in the first terminal. In a case in which it is found that the application is not installed in the second terminal, 240 is performed.

240. The second terminal installs the application in the second terminal according to the identification information of the application and starts the application.

250. The second terminal synchronizes, according to the status information of the application, status information of the application in the second terminal with the status information of the application in the first terminal.

For example, that the second terminal synchronizes, according to the status information of the application, the status information of the application in the second terminal with the status information of the application in the first terminal may be implemented in the following manner:

The second terminal synchronizes, according to the status information of the application, the status information of the application in the second terminal with the status information of the application in the first terminal in a manner of searching for a configuration file of the application and writing the status information of the application into the configuration file that is of the application and is found by the second terminal; or the second terminal synchronizes, according to the status information of the application, the status information of the application in the second terminal with the status information of the application in the first terminal in a manner of writing the status information of the application into a database file of the second terminal.

According to the application information sharing method provided in this embodiment, a second terminal receives, by using Near Field Communication, application information sent by a first terminal; parses the application information to obtain identification information of an application and status information of the application; performs a query on the second terminal according to the identification information of the application; and in a case in which it is found that the application is not installed in the second terminal, installs the application in the second terminal according to the identification information of the application and starts the application. The second terminal synchronizes, according to the status information of the application, status information of the application in the second terminal with the status information of the application in the first terminal. Therefore, this resolves a problem in the prior art that an entire process of implementing application information sharing includes more steps that involve manual operations, is cumbersome and time-consuming, and has a limitation, thereby improving application information sharing efficiency.

Figure 3:
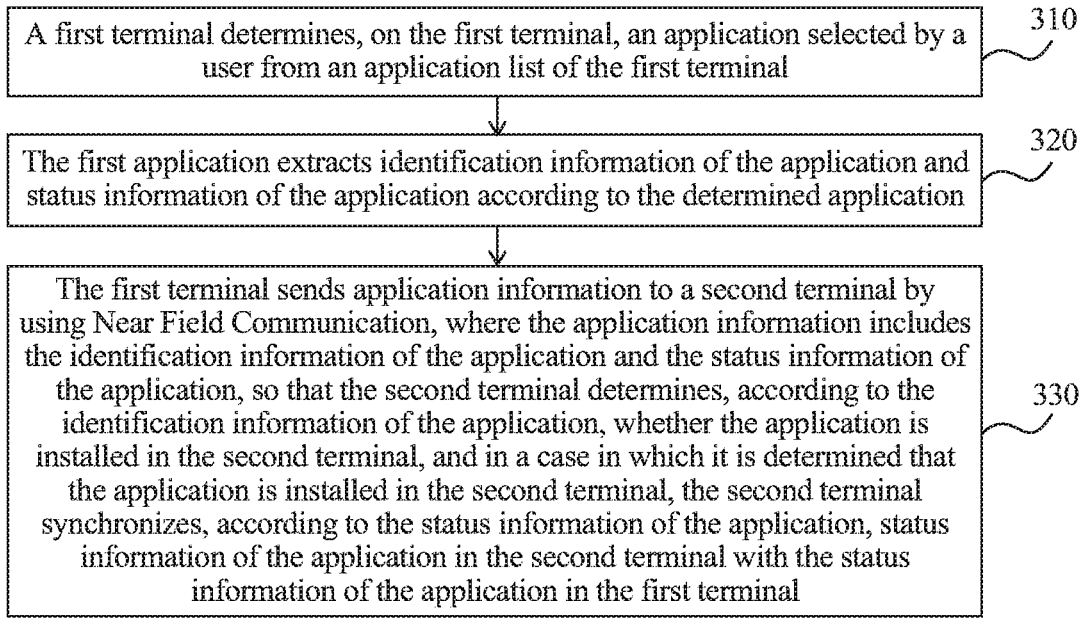
FIG. 3 is a flowchart of an application information sharing method according to Embodiment 3.

FIG. 3 is a flowchart of an application information sharing method according to Embodiment 3. The method in this embodiment includes the following steps.

310. A first terminal determines, on the first terminal, an application selected by a user from an application list of the first terminal.

320. The first terminal extracts identification information of the application and status information of the application according to the determined application.

330. The first terminal sends application information to a second terminal by using Near Field Communication, where the application information includes the identification information of the application and the status information of the application, so that the second terminal determines, according to the identification information of the application, whether the application is installed in the second terminal, and in a case in which it is determined that the application is installed in the second terminal, the second terminal synchronizes, according to the status information of the application, status information of the application in the second terminal with the status information of the application in the first terminal.

According to the application information sharing method provided in this embodiment, a first terminal determines, on the first terminal, an application selected by a user from an application list of the first terminal; extracts identification information of the application and status information of the application according to the determined application; sends application information to a second terminal by using Near Field Communication, so that the second terminal determines, according to the identification information of the application, whether the application is installed in the second terminal, and in a case in which it is determined that the application is installed in the second terminal, the second terminal synchronizes, according to the status information of the application, status information of the application in the second terminal with the status information of the application in the first terminal. Therefore, this resolves a problem in the prior aft that an entire process of implementing application information sharing includes more steps that involve manual operations, is cumbersome and time-consuming, and has a limitation, thereby improving application information sharing efficiency.

Further, on the basis of the foregoing Embodiment 3, that the first terminal extracts the identification information of the application and the status information of the application according to the determined application may be implemented in the following manner.

The first terminal extracts the identification information of the application and the status information of the application from a configuration file of the determined application or a database file.

Further, on the basis of the foregoing Embodiment 3, the status information of the application may be current running status information of the application.

Further, on the basis of the foregoing Embodiment 3, the identification information of the application may be a name of the application, a serial number of the application, or an md5 value of the application.

Figure 4A:
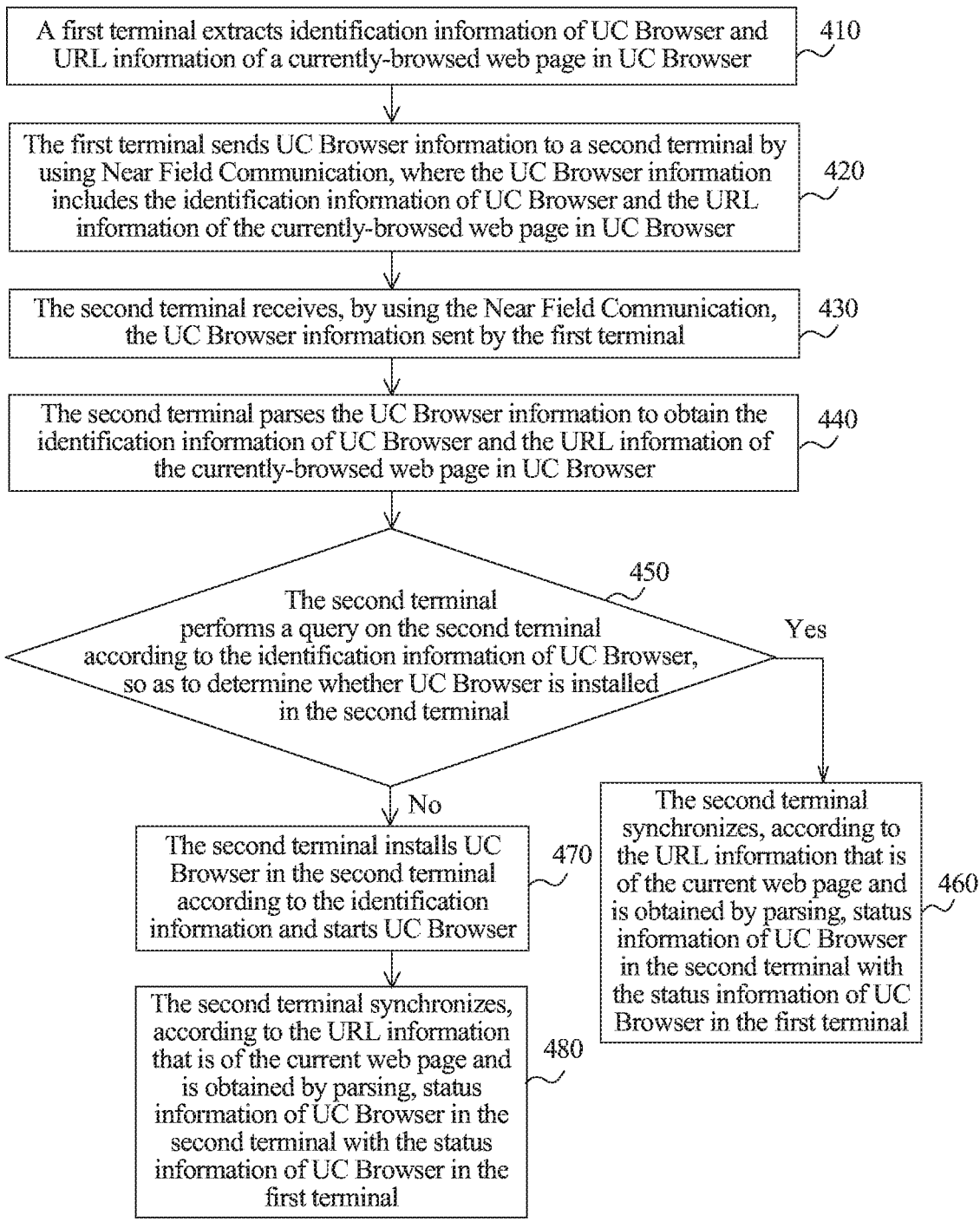
FIG. 4A is a flowchart of an application information sharing method according to Embodiment 4.
Figure 4B:
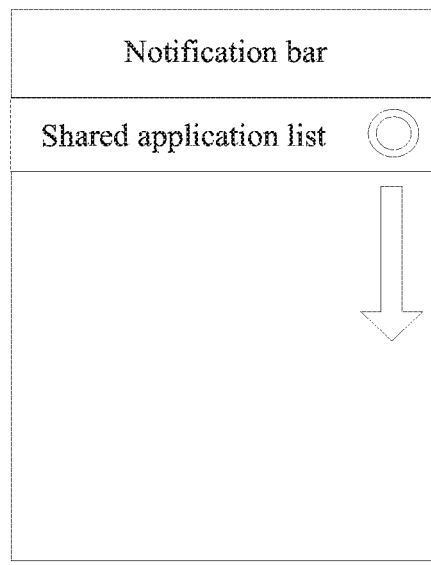
FIG. 4B is a schematic diagram of an interface of a drop-down menu that is of a shared application list in a notification bar of a first terminal and is started by a user according to Embodiment 4.
Figure 4C:
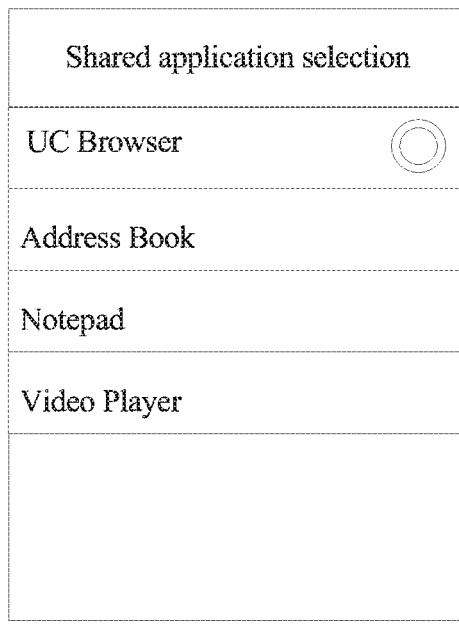
FIG. 4C is a schematic diagram of an interface for selecting a shared application by a user after the user starts a drop-down menu of a shared application list in a notification bar of a first terminal according to Embodiment 4.
Figure 4D:
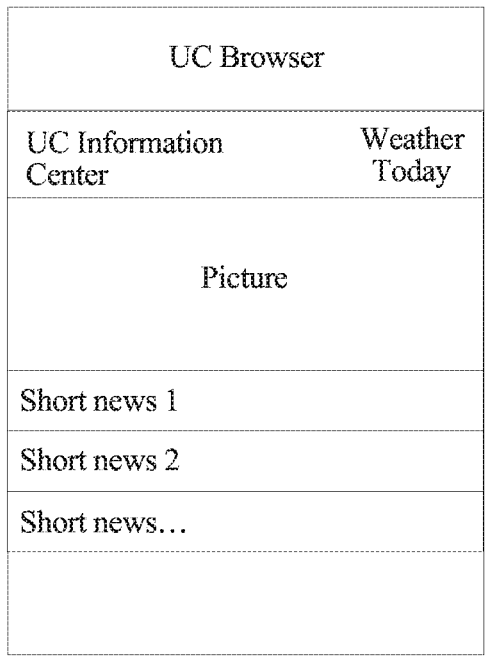
FIG. 4D is a schematic diagram of synchronizing, by a second terminal according to status information that is of an application and is sent by a first terminal, status information of the application in the second terminal with the status information of the application in the first terminal according to Embodiment 4.

To introduce an application information sharing method provided in the foregoing embodiments in detail, the following respectively introduces a specific process of sharing application information with reference to FIG. 4A to FIG. 4I, FIG. 5A to FIG. 5I, FIG. 6A to FIG. 6H, and FIG. 7A to FIG. 7H. An embodiment describes an application information sharing method with reference to FIG. 4A to FIG. 4I. FIG. 4A is a flowchart of an application information sharing method according to Embodiment 4. FIG. 4B is a schematic diagram of an interface of a drop-down menu that is of a shared application list in a notification bar of a first terminal and is started by a user according to Embodiment 4. FIG. 4C is a schematic diagram of an interface for selecting a shared application by the user after the user starts the drop-down menu of the shared application list in the notification bar of the first terminal according to Embodiment 4. As shown in FIG. 4C, an application currently selected by the user is UC Browser. FIG. 4D is a schematic diagram of synchronizing, by a second terminal according to status information that is of an application and is sent by the first terminal, status information of the application in the second terminal with the status information of the application in the first terminal according to Embodiment 4. In this embodiment, the status information of the application refers to uniform resource locator (URL) information of a currently-opened UC Information Center web page in UC Browser. Status information that is of the application and is currently displayed in the first terminal is the same as that in FIG. 4D, that is, the application currently displayed in the first terminal is the URL information of the currently-browsed web page in UC Browser. When a shared application selected by the user from four applications (UC Browser, Address Book, Notepad, and Video Player) displayed in the first terminal is UC Browser, that is, when the first terminal determines, on the first terminal, the application selected by the user from an application list of the first terminal is UC Browser, 410 is performed.

410. The first terminal extracts identification information of UC Browser and the URL information of the currently-browsed web page in UC Browser.

The URL information of the currently-browsed web page in UC Browser is status information that is of the application and is to be shared with the second terminal, and when necessary, position information of the currently-browsed web page may further be extracted. For example, when 30% of the web page is browsed, extracted position information of the currently-browsed web page is also used as the status information of the application for sharing with the second terminal.

420. The first terminal sends UC Browser information to the second terminal by using Near Field Communication, where the UC Browser information includes the identification information of UC Browser and the URL information of the currently-browsed web page in UC Browser.

430. The second terminal receives, by using Near Field Communication, the UC Browser information sent by the first terminal.

440. The second terminal parses the UC Browser information to obtain the identification information of UC Browser and the URL information of the currently-browsed web page in UC Browser.

450. The second terminal performs a query on the second terminal according to the identification information of UC Browser, so as to determine whether UC Browser is installed in the second terminal.

If it is determined that UC Browser is installed in the second terminal, 460 is performed; if it is determined that UC Browser is not installed in the second terminal, 470 is performed.

460. The second terminal synchronizes, according to the URL information that is of the current web page and is obtained by parsing, status information of UC Browser in the second terminal with the URL information of the current web page in UC Browser in the first terminal.

Figure 4E:
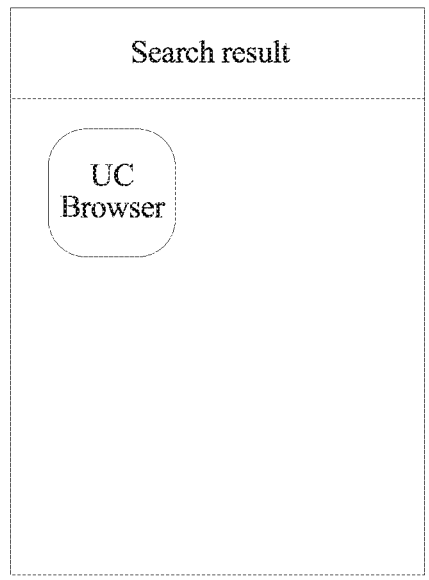
FIG. 4E is a schematic diagram of an interface of UC Browser found by a second terminal according to identification information that is of UC Browser and is sent by a first terminal according to Embodiment 4.
Figure 4F:
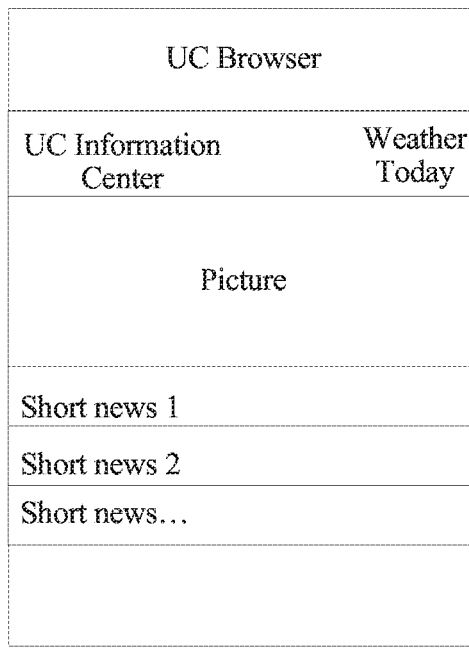
FIG. 4F is a schematic diagram of an interface of UC Browser directly started by a second terminal after finding UC Browser according to Embodiment 4.

A process of 460 is shown in FIG. 4E and FIG. 4F, and after synchronization, the status information of UC Browser in the second terminal may be the URL information of the currently-browsed web page. FIG. 4E is a schematic diagram of an interface of UC Browser found by the second terminal according to the identification information that is of UC Browser and is sent by the first terminal according to Embodiment 4. The interface may also be omitted and FIG. 4F is directly displayed. FIG. 4F is a schematic diagram of an interface of UC Browser directly started by the second terminal after finding UC Browser according to Embodiment 4. In FIG. 4F, the second terminal directly loads the web page according to the URL information that is of the currently-browsed web page in UC Browser and is sent by the first terminal, and further, may further directly scroll the web page to a browse position at 30% of the web page according to position information.

470. The second terminal installs UC Browser in the second terminal according to the identification information and starts UC Browser.

Figure 4G:
FIG. 4G is a schematic diagram of an interface of prompt information provided when a second terminal does not find UC Browser according to Embodiment 4.
Figure 4H:
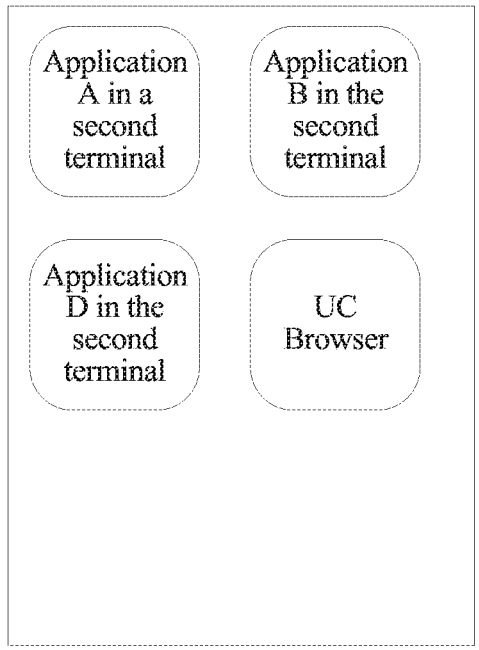
FIG. 4H is a schematic diagram of an interface for adding UC Browser by a second terminal according to a selection of a user according to Embodiment 4.

FIG. 4G is a schematic diagram of an interface of prompt information provided when the second terminal does not find UC Browser according to Embodiment 4. FIG. 4H is a schematic diagram of an interface for adding UC Browser by the second terminal according to a selection of the user according to Embodiment 4. As shown in FIG. 4H, in FIG. 4H, the second terminal adds UC Browser into the second terminal according to the identification information.

480. The second terminal synchronizes, according to the URL information that is of the current web page and is obtained by parsing, status information of UC Browser in the second terminal with status information of UC Browser in the first terminal.

It should be noted that the status information of UC Browser in the second terminal is synchronized to the status information of UC Browser in the first terminal, that is, the status information of UC Browser in the second terminal is synchronized to the URL information that is of the currently-browsed web page in UC Browser and is sent by the first terminal.

Figure 4I:
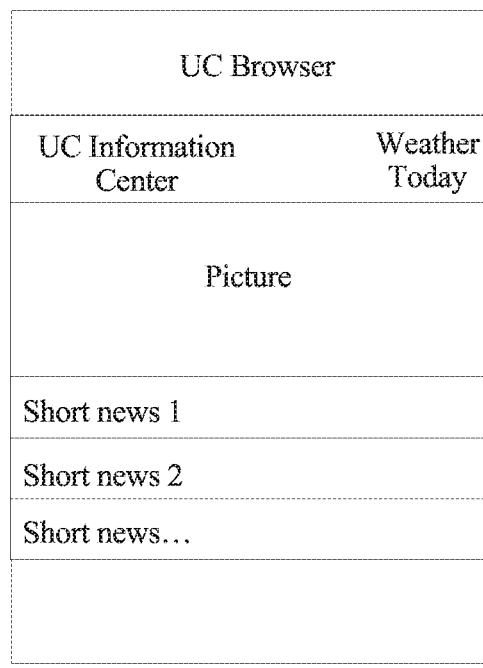
FIG. 4I is a schematic diagram of an interface of UC Browser started after installation of UC Browser in a second terminal is completed according to Embodiment 4.

A process of 480 is shown in FIG. 4I. FIG. 4I is a schematic diagram of an interface of UC Browser started after installation of UC Browser in the second terminal is completed according to Embodiment 4. The second terminal directly loads the web page according to the URL information that is of the currently-browsed web page in UC Browser and is sent by the first terminal, and further, may scroll the web page to the browse position at 30% of the web page according to the position information.

According to the application information sharing method provided in this embodiment, a second terminal receives, by using Near Field Communication, UC Browser information sent by a first terminal, where the UC Browser information includes identification information of UC Browser and URL information of a currently-browsed web page in UC Browser; parses the UC Browser information to obtain the identification information of UC Browser and the URL information of the currently-browsed web page in UC Browser; performs a query on the second terminal according to the identification information of UC Browser, so as to determine whether UC Browser is installed in the second terminal; and in a case in which it is found that UC Browser is installed in the second terminal, synchronizes, according to the identification information that is of UC Browser and is obtained by parsing, status information of UC Browser in the second terminal with the URL information of the current web page in UC Browser in the first terminal, or in a case in which it is found that UC Browser is not installed in the second terminal, installs UC Browser in the second terminal according to the identification information of UC Browser and starts UC Browser, and synchronizes, according to the identification information that is of UC Browser and is obtained by parsing, status information of UC Browser in the second terminal with the URL information of the current web page in UC Browser in the first terminal. Therefore, this resolves a problem in the prior art that an entire process of implementing application information sharing includes more steps that involve manual operations, is cumbersome and time-consuming, and has a limitation, thereby improving application information sharing efficiency.

Figure 5A:
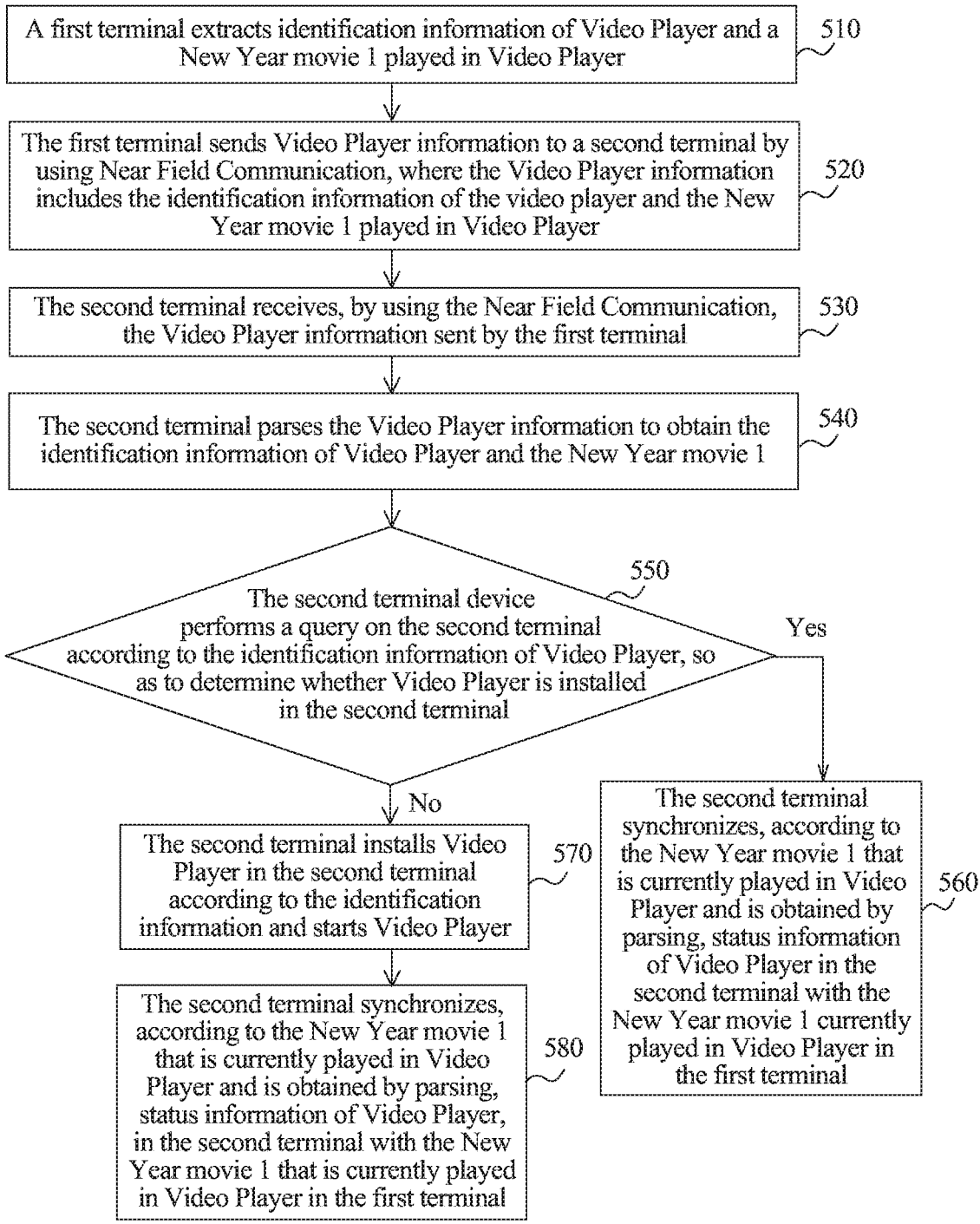
FIG. 5A is a flowchart of an application information sharing method according to Embodiment 5.
Figure 5B:
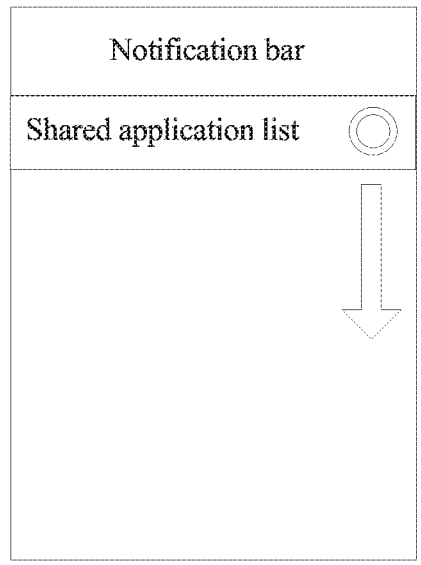
FIG. 5B is a schematic diagram of an interface of a drop-down menu that is of a shared application list in a notification bar of a first terminal and is started by a user according to Embodiment 5.
Figure 5C:
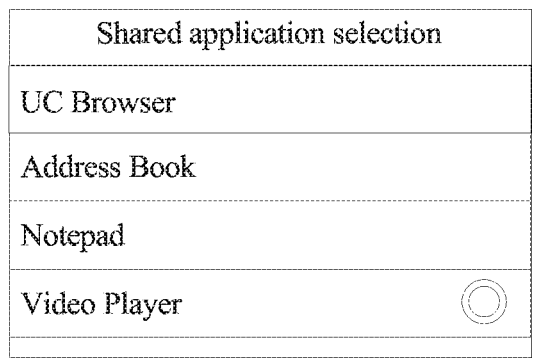
FIG. 5C is a schematic diagram of an interface for selecting a shared application by a user after the user starts a drop-down menu of a shared application list in a notification bar of a first terminal according to Embodiment 5.
Figure 5D:
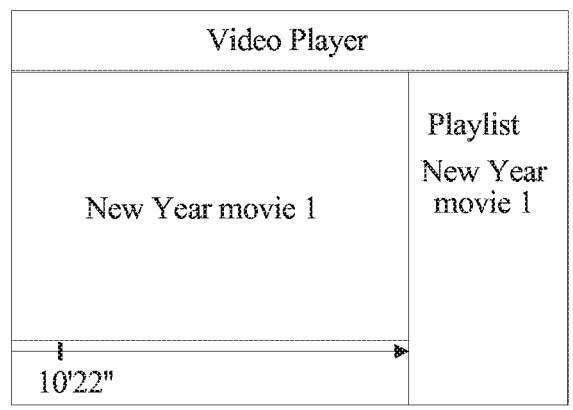
FIG. 5D is a schematic diagram for synchronizing, by a second terminal according to status information that is of an application and is sent by a first terminal, status information of the application in the second terminal with the status information of the application in the first terminal according to Embodiment 5.

FIG. 5A is a flowchart of an application information sharing method according to Embodiment 5. FIG. 5B is a schematic diagram of an interface of a drop-down menu that is of a shared application list in a notification bar of a first terminal and is started by a user according to Embodiment 5. FIG. 5C is a schematic diagram of an interface for selecting a shared application by the user after the user starts the drop-down menu of the shared application list in the notification bar of the first terminal according to Embodiment 5. As shown in FIG. 5C, an application currently selected by the user is Video Player. FIG. 5D is a schematic diagram for synchronizing, by a second terminal according to status information that is of an application and is sent by the first terminal, status information of the application in the second terminal with the status information of the application in the first terminal according to Embodiment 5. In this embodiment, the status information that is of the application and is sent by the first terminal refers to, as shown in FIG. 5D, a New Year movie 1 played in Video Player and play process information of the New Year movie 1. When a shared application selected by the user from four applications (UC Browser, Address Book, Notepad, and Video Player), shown in FIG. 5C, displayed in the first terminal is Video Player, that is, when the first terminal determines, on the first terminal, the application selected by the user from the application list of the first terminal is Video Player, 510 is performed.

510. The first terminal extracts identification information of Video Player and the New Year movie 1 played in Video Player.

The New Year movie 1 played in Video Player is the status information that is of the application and is to be shared with the second terminal, and if necessary, position information of the played New Year movie 1 may be further extracted. For example, the New Year movie 1 is played to the $22^{nd}$ seconds of the $10^{th}$ minute, which is represented as 10'22", and the extracted position information of the New Year movie 1 is also used as the status information of the application for sharing with the second terminal.

520. The first terminal sends Video Player information to the second terminal by using Near Field Communication, where the Video Player information includes the identification information of Video Player and the New Year movie 1 played in Video Player.

530. The second terminal receives, by using Near Field Communication, the Video Player information sent by the first terminal.

540. The second terminal parses the Video Player information to obtain the identification information of Video Player and the New Year movie 1.

550. The second terminal performs a query on the second terminal according to the identification information of Video Player, so as to determine whether Video Player is installed in the second terminal.

If it is determined that Video Player is installed in the second terminal, 560 is performed; if it is determined that Video Player is not installed in the second terminal, 570 is performed.

560. The second terminal synchronizes, according to the New Year movie 1 that is currently played in Video Player and is obtained by parsing, status information of Video Player in the second terminal with the New Year movie 1 currently played in Video Player in the first terminal.

Figure 5E:
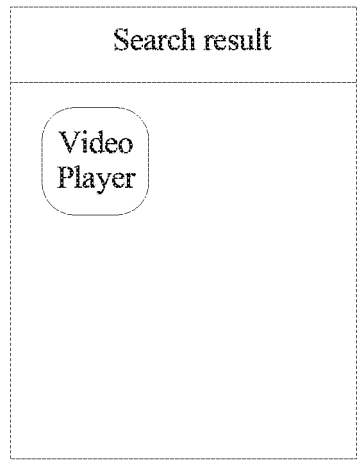
FIG. 5E is a schematic diagram of an interface of Video Player found by a second terminal according to identification information that is of Video Player and is sent by a first terminal according to Embodiment 5.
Figure 5F:
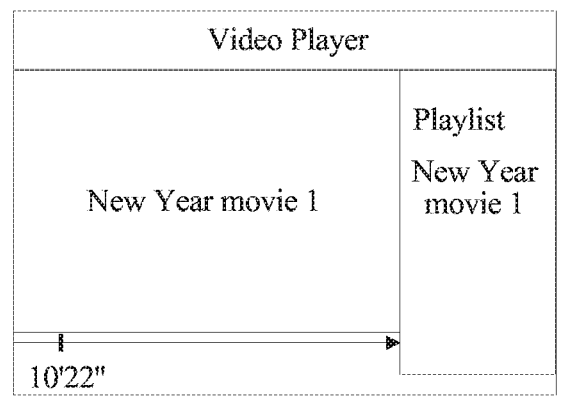
FIG. 5F is a schematic diagram of an interface of Video Player directly started by a second terminal after finding Video Player according to Embodiment 5.

A process of 560 is shown in FIG. 5E and FIG. 5F, and after synchronization, the status information of Video Player in the second terminal is information about the New Year movie 1. FIG. 5E is a schematic diagram of an interface of Video Player found by the second terminal according to the identification information that is of Video Player and is sent by the first terminal according to Embodiment 5. The interface may also be omitted and FIG. 5F is directly displayed. FIG. 5F is a schematic diagram of an interface of Video Player directly started by the second terminal after finding Video Player according to Embodiment 5. In FIG. 5F, the second terminal directly loads a web page according to the information that is about the New Year movie 1 and is sent by the first terminal, and further, may further directly drag the New Year movie 1 to a play position at the $22^{nd}$ seconds of the $10^{th}$ minute according to the position information.

570. The second terminal installs Video Player in the second terminal according to the identification information and starts Video Player.

Figure 5G:
FIG. 5G is a schematic diagram of an interface of prompt information provided when a second terminal does not find Video Player according to Embodiment 5.
Figure 5H:
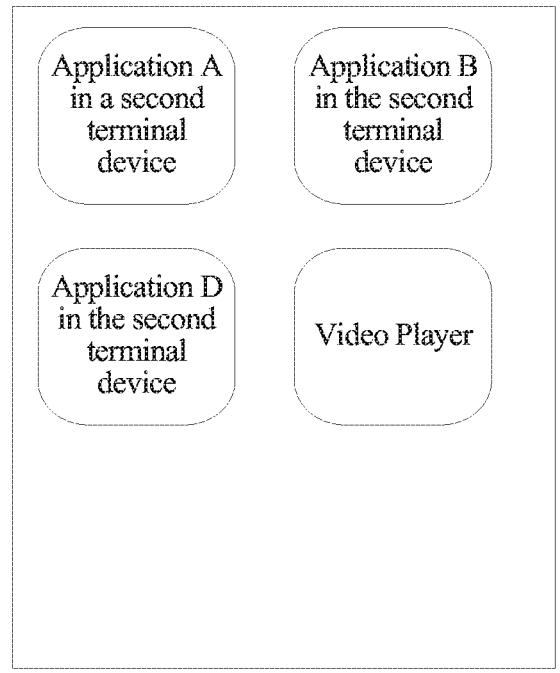
FIG. 5H is a schematic diagram of an interface for adding Video Player by a second terminal according to a selection of a user according to Embodiment 5.

FIG. 5G is a schematic diagram of an interface of prompt information provided when the second terminal does not find Video Player according to Embodiment 5. FIG. 5H is a schematic diagram of an interface for adding Video Player by the second terminal according to a selection of the user according to Embodiment 5. As shown in FIG. 5H, in FIG. 5H, the second terminal adds Video Player into the second terminal according to the identification information.

580. The second terminal synchronizes, according to the New Year movie 1 that is currently played in Video Player and is obtained by parsing, status information of Video Player in the second terminal with the New Year movie 1 currently played in Video Player in the first terminal.

Figure 5I:
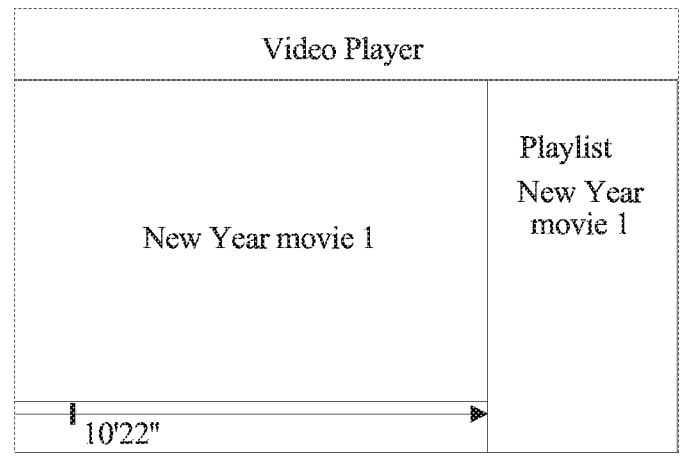
FIG. 5I is a schematic diagram of an interface of Video Player started after installation of Video Player in a second terminal is completed according to Embodiment 5.

A process of 580 is shown in FIG. 5I. FIG. 5I is a schematic diagram of an interface of Video Player started after installation of Video Player in the second terminal is completed according to Embodiment 5. The second terminal directly loads the web page according to the New Year movie 1 sent by the first terminal, and further may drag the New Year movie 1 to the play position of the $22^{nd}$ seconds of the $10^{th}$ minute according to the position information.

According to the application information sharing method provided in this embodiment, a second terminal receives, by using Near Field Communication, information sent by a first terminal, where the information includes identification information of Video Player and information about a New Year movie 1 played in Video Player; parses the Video Player information, so as to obtain the identification information of Video Player and the information about the New Year movie 1; performs a query on the second terminal according to the identification information of Video Player; and in a case in which it is found that Video Player is installed in the second terminal, synchronizes, according to the identification information that is of Video Player and is obtained by parsing, status information of Video Player in the second terminal with the information about the New Year movie 1 played in Video Player in the first terminal, or in a case in which it is found that Video Player is not installed in the second terminal, installs Video Player according to the identification information of Video Player and starts Video Player, and synchronizes, according to the identification information that is of UC Browser and is obtained by parsing, according to the identification information that is of Video Player and is obtained by parsing, status information of Video Player in the second terminal with the information about the New Year movie 1 played in Video Player in the first terminal. Therefore, this resolves a problem in the prior art that an entire process of implementing application information sharing includes more steps that involve manual operations, is cumbersome and time-consuming, and has a limitation, thereby improving application information sharing efficiency.

Figure 6A:
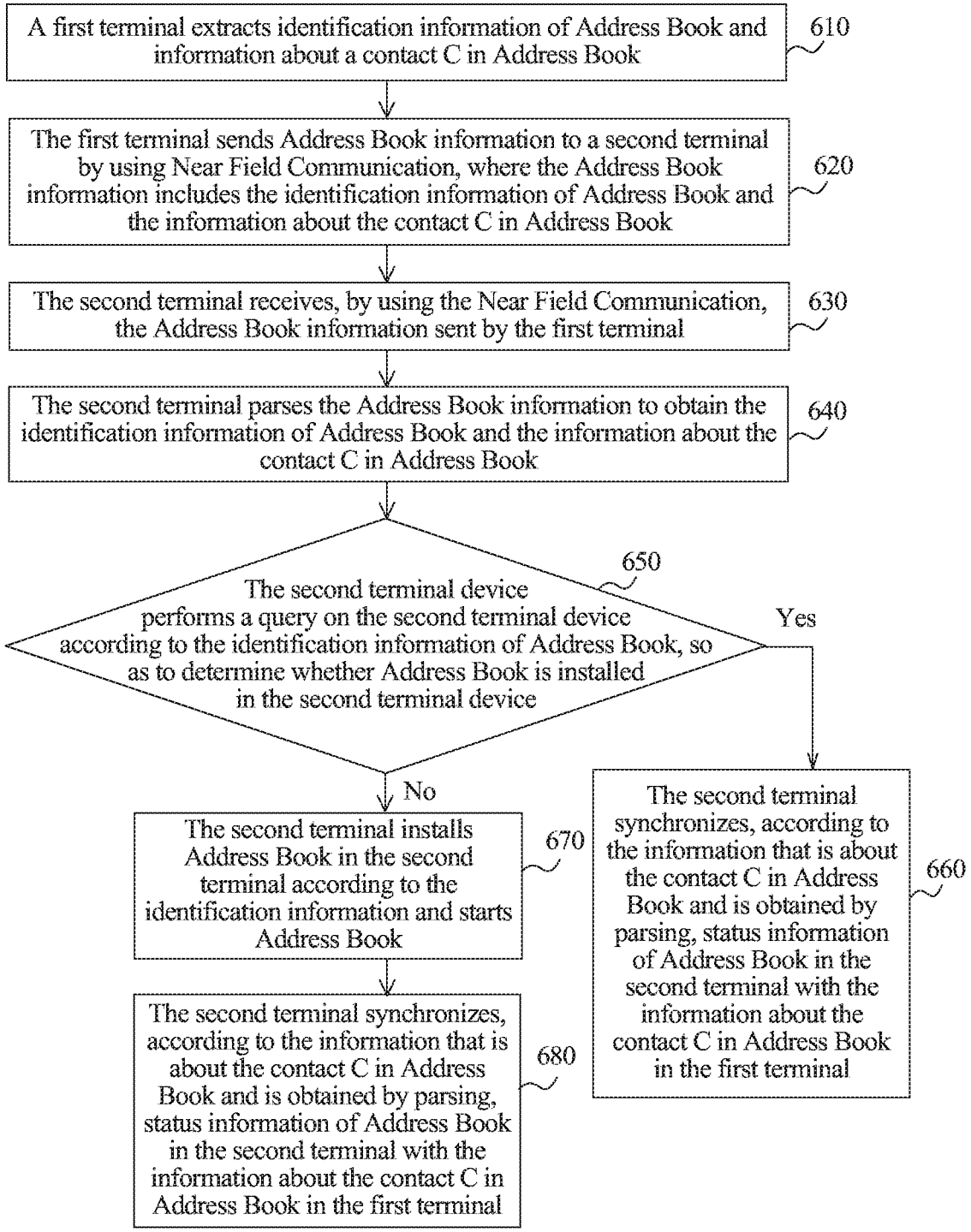
FIG. 6A is a flowchart of an application information sharing method according to Embodiment 6.
Figure 6B:
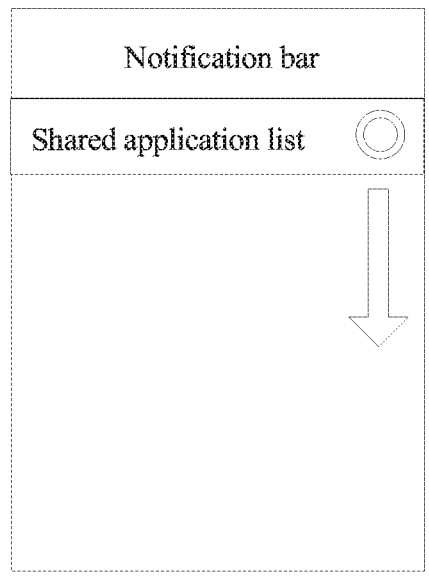
FIG. 6B is a schematic diagram of an interface of a drop-down menu that is of a shared application list in a notification bar of a first terminal and is started by a user according to Embodiment 6.
Figure 6C:
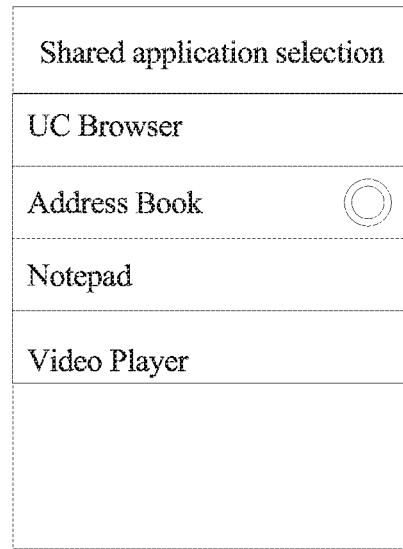
FIG. 6C is a schematic diagram of an interface for selecting a shared application by a user after the user starts a drop-down menu of a shared application list in a notification bar of a first terminal according to Embodiment 6.

FIG. 6A is a flowchart of an application information sharing method according to Embodiment 6. FIG. 6B is a schematic diagram of an interface of a drop-down menu that is of a shared application list in a notification bar of a first terminal and is started by a user according to Embodiment 6. FIG. 6C is a schematic diagram of an interface for selecting a shared application by the user after the user starts the drop-down menu of the shared application list in the notification bar of the first terminal according to Embodiment 6. As shown in FIG. 6C, an application currently selected by the user is Address Book. FIG. 6D is a schematic diagram of an interface of information, in Address Book, displayed in the first terminal according to Embodiment 6. FIG. 6E is a schematic diagram of an interface of detailed information of a contact C in the first terminal according to Embodiment 6. In this embodiment, status information that is of the application and is sent by the first terminal refers to information that is of the contact C in Address Book and is shown in FIG. 6E. When a shared application selected by the user from four applications (UC Browser, Address Book, Notepad, and Video Player), shown in FIG. 6C, displayed in the first terminal as shown in FIG. 6C is Address Book, that is, when the first terminal determines, on the first terminal, the application selected by the user from the application list of the first terminal is Address Book, 610 is performed.

610. The first terminal extracts identification information of Address Book and information about the contact C in Address Book.

The information about the contact C in Address Book is status information that is of the application and is to be shared with the second terminal, and contact information may be text, or may be exported information in a common contact versitcard format such as vcf and csv.

620. The first terminal sends the Address Book information to the second terminal by using Near Field Communication, where the Address Book information includes the identification information of Address Book and the information about the contact C in Address Book.

630. The second terminal receives, by using Near Field Communication, the Address Book information sent by the first terminal.

640. The second terminal parses the Address Book information to obtain the identification information of Address Book and the information about the contact C in Address Book.

650. The second terminal performs a query on the second terminal according to the identification information of Address Book, so as to determine whether Address Book is installed in the second terminal.

If it is determined that Address Book is installed in the second terminal, 660 is performed; otherwise, 670 is performed.

660. The second terminal synchronizes, according to the information that is about the contact C in Address Book and is obtained by parsing, status information of Address Book in the second terminal with the information about the contact C in Address Book in the first terminal.

Figure 6F:
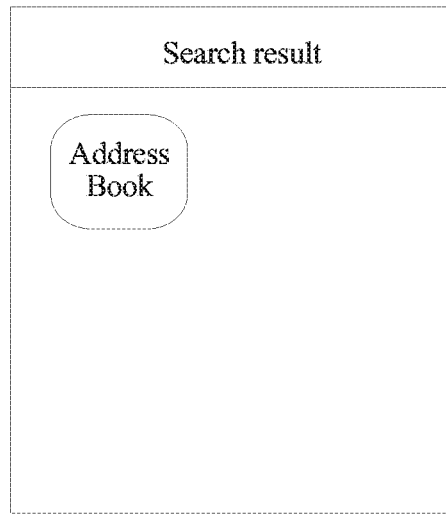
FIG. 6F is a schematic diagram of an interface of Address Book found by a second terminal according to identification information that is of Address Book and is sent by a first terminal according to Embodiment 6.
Figure 6G:
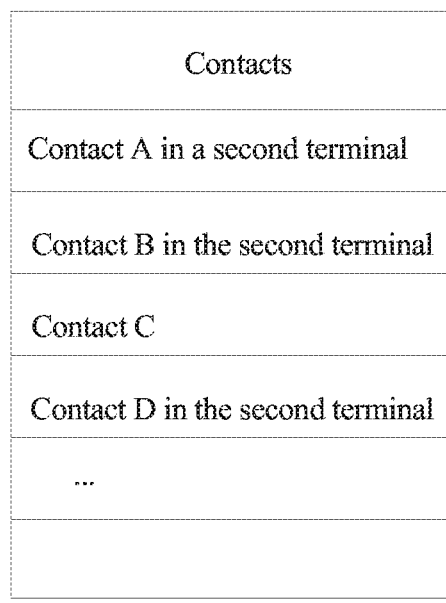
FIG. 6G is a schematic diagram of an interface that is for adding a contact and is started directly after a second terminal finds Address Book according to Embodiment 6.

A process of 660 is shown in FIG. 6F to FIG. 6H, and after synchronization, the status information of Address Book in the second terminal may be the information about the contact C. FIG. 6F is a schematic diagram of an interface of Address Book found by the second terminal according to the identification information that is of Address Book and is sent by the first terminal according to Embodiment 6. FIG. 6G is a schematic diagram of an interface that is for adding a contact and is started directly after the second terminal finds Address Book according to Embodiment 6. In this embodiment, the contact added into the second terminal is the contact C. In FIG. 6G, the second terminal directly adds the information about the contact C according to information that is about a current contact in Address Book and is sent by the first terminal. FIG. 6H is a schematic diagram of an interface of information about the contact added by the second terminal according to Embodiment 6.

670. The second terminal installs Address Book in the second terminal according to the identification information and starts Address Book.

680. The second terminal synchronizes, according to the information that is about the contact C in Address Book and is obtained by parsing, status information of Address Book in the second terminal with the information about the contact C in Address Book in the first terminal.

According to the application information sharing method according to this embodiment, a second terminal receives, by using Near Field Communication, information sent by a first terminal, where the information includes identification information of Address Book and information about a current contact; parses the Address Book information to obtain the identification information of Address Book and the information about the contact C in Address Book; performs a query on the second terminal according to the identification information of Address Book, so as to determine whether Address Book is installed in the second terminal; and in a case in which it is found that Address Book is installed in the second terminal, synchronizes, according to the identification information that is of Address Book and is obtained by parsing, status information of Address Book in the second terminal with the information about the contact C in Address Book in the first terminal, or in a case in which it is found that Address Book is not installed in the second terminal, installs Address Book in the second terminal according to the identification information of Address Book and starts Address Book, and synchronizes, according to the identification information that is of Address Book and is obtained by parsing, status information of Address Book in the second terminal with the information about the contact C in Address Book in the first terminal. Therefore, this resolves a problem in the prior art that an entire process of implementing application information sharing includes more steps that involve manual operations, is cumbersome and time-consuming, and has a limitation, thereby improving application information sharing efficiency.

Figure 7A:
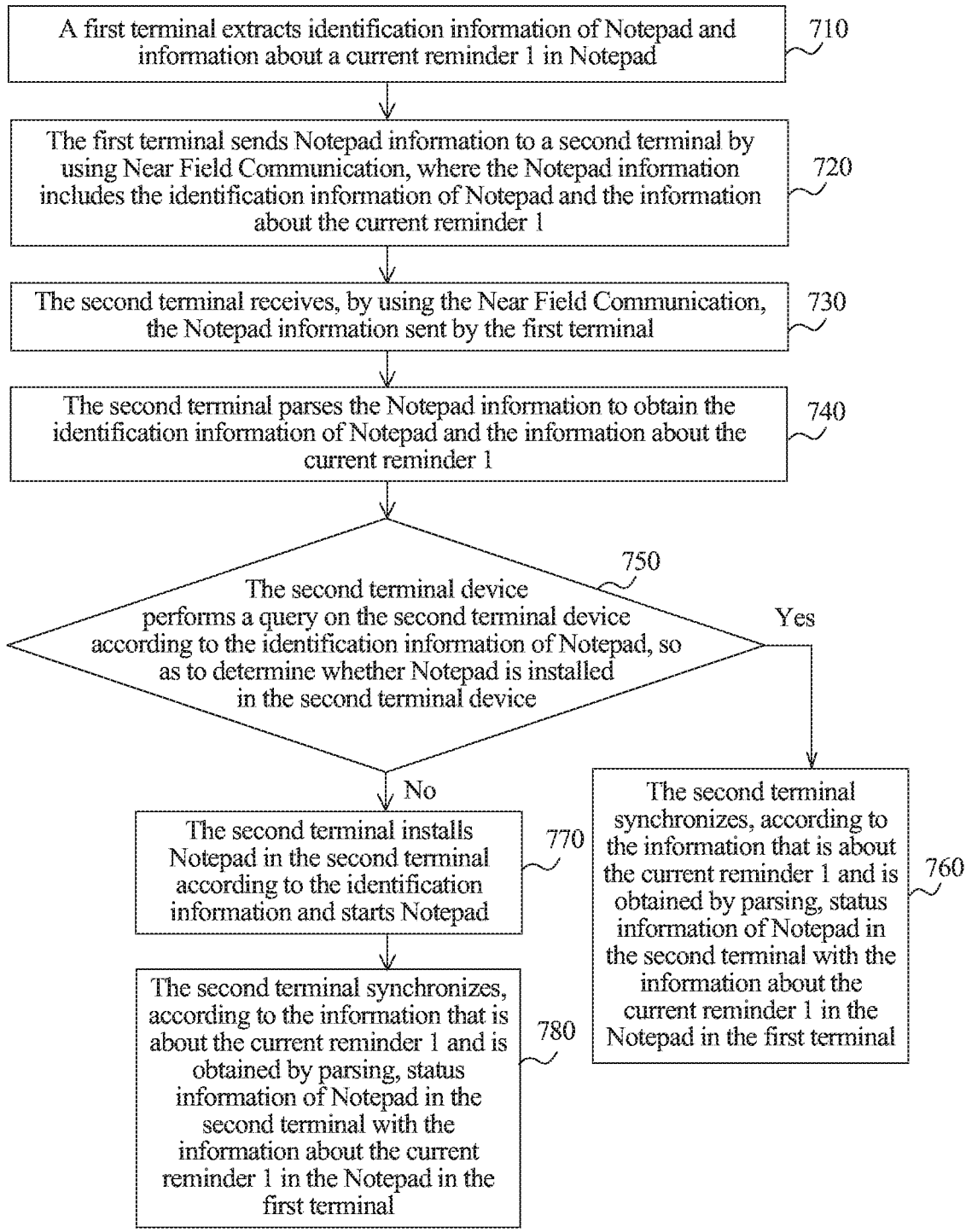
FIG. 7A is a flowchart of an application information sharing method according to Embodiment 7.
Figure 7B:
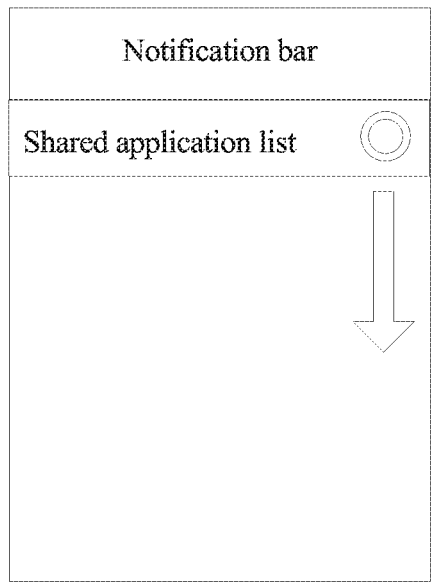
FIG. 7B is a schematic diagram of an interface of a drop-down menu that is of a shared application list in a notification bar of a first terminal and is started by a user according to Embodiment 7.
Figure 7C:
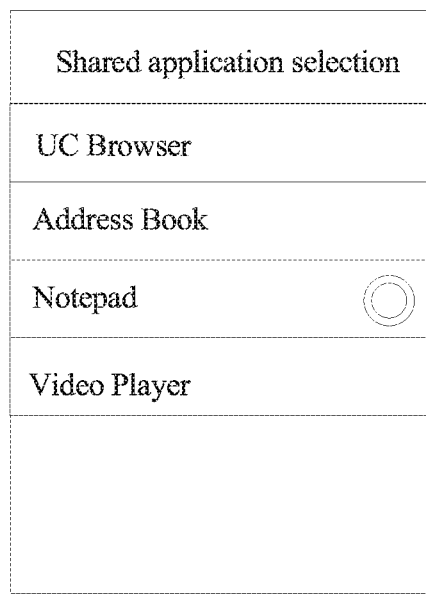
FIG. 7C is a schematic diagram of an interface for selecting a shared application by a user after the user starts a drop-down menu of a shared application list in a notification bar of a first terminal according to Embodiment 6.

FIG. 7A is a flowchart of an application information sharing method according to Embodiment 7. FIG. 7B is a schematic diagram of an interface of a drop-down menu that is of a shared application list in a notification bar of a first terminal and is started by a user according to Embodiment 6. FIG. 7C is a schematic diagram of an interface for selecting a shared application by the user after the user starts the drop-down menu of the shared application list in the notification bar of the first terminal according to Embodiment 6. As shown in FIG. 7C, an application currently selected by the user is Notepad. FIG. 7D is a schematic diagram of an interface of information, in Notepad, displayed in the first terminal according to Embodiment 7. FIG. 7E is a schematic diagram of an interface of detailed information of a reminder 1 in the first terminal according to Embodiment 7. In this embodiment, status information that is of an application and is sent by the first terminal refers to information about the reminder 1 shown in FIG. 7E. When a shared application selected by the user from four applications (UC Browser, Address Book, Notepad, and Video Player), shown in FIG. 7C, displayed in the first terminal is Notepad, that is, when the first terminal determines, on the first terminal, the application selected by the user from the application list of the first terminal is Notepad, 710 is performed.

710. The first terminal extracts identification information of Notepad and the information about the current reminder 1 in Notepad.

The information about the current reminder 1 in Notepad is status information that is of the application and is to be shared with the second terminal.

720. The first terminal sends Notepad information to the second terminal by using Near Field Communication, where the Notepad information includes the identification information of Notepad and the information about the current reminder 1.

730. The second terminal receives, by using Near Field Communication, the Notepad information sent by the first terminal.

740. The second terminal parses the Notepad information to obtain the identification information of Notepad and the information about the current reminder 1.

750. The second terminal performs a query on the second terminal according to the identification information of Notepad, so as to determine whether Notepad is installed in the second terminal.

If it is determined that Notepad is installed in the second terminal, 760 is performed; otherwise, 770 is performed.

760. The second terminal synchronizes, according to the information that is about the current reminder 1 and is obtained by parsing, status information of Notepad in the second terminal with the information about the current reminder 1 in Notepad in the first terminal.

After Notepad information in the second terminal is synchronized, the status information of Notepad in the second terminal is the information about the current reminder 1.

Figures 7F, 7G:
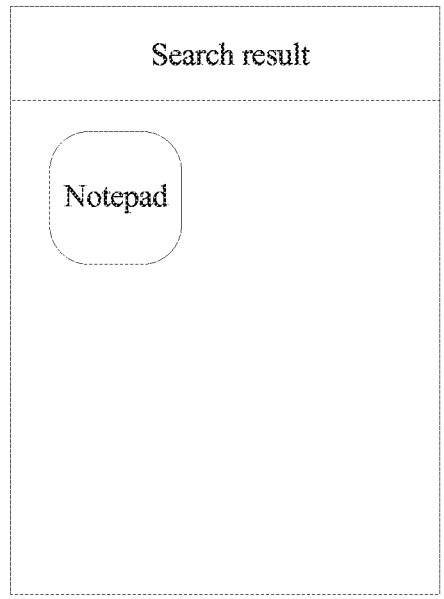
FIG. 7F is a schematic diagram of an interface of Notepad found by a second terminal according to identification information that is of Notepad and is sent by a first terminal according to Embodiment 7.
FIG. 7G is a schematic diagram of an interface that is for adding a current reminder 1 and is started directly after a second terminal finds a same application according to Embodiment 7.
Figure 7H:
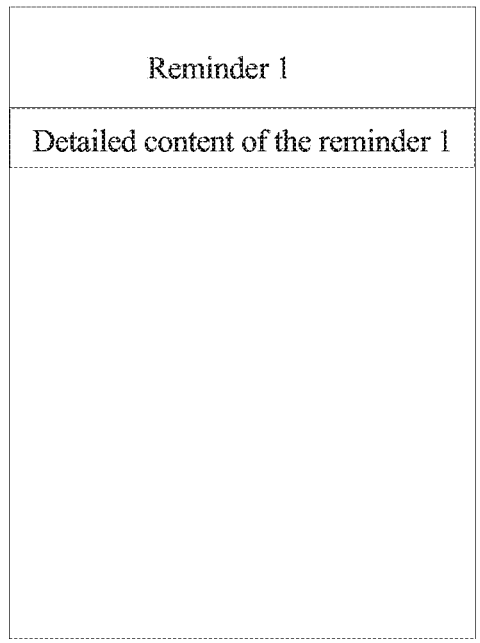
FIG. 7H is a schematic diagram of an interface of information about a current reminder 1 added by a second terminal according to Embodiment 7.

A process of 760 is shown in FIG. 7F to FIG. 7H. FIG. 7F is a schematic diagram of an interface of Notepad found by the second terminal according to the identification information that is of Notepad and is sent by the first terminal according to Embodiment 7. FIG. 7G is a schematic diagram of an interface that is for adding the current reminder 1 and is started directly after the second terminal finds a same application according to Embodiment 7. In this embodiment, the reminder 1 is added into the second terminal. In FIG. 7G, the second terminal directly adds the current reminder 1 according to information that is about the current reminder 1 and is sent by the first terminal. FIG. 7H is a schematic diagram of an interface of information about the current reminder 1 added by the second terminal according to Embodiment 7.

770. The second terminal installs Notepad in the second terminal according to the identification information and starts Notepad.

780. The second terminal synchronizes, according to the information that is about the current reminder 1 and is obtained by parsing, status information of Notepad in the second terminal with the information about the current reminder 1 in Notepad in the first terminal.

According to the application information sharing method provided in this embodiment, a second terminal receives, by using Near Field Communication, information sent by a first terminal, where the information includes identification information of Notepad and information about a current reminder 1; parses the Notepad information to obtain the identification information of Notepad and the information about the current reminder 1; performs a query on the second terminal according to the identification information of Notepad, so as to determine whether Notepad is installed in the second terminal; and in a case in which it is found that Notepad is installed in the second terminal, synchronizes, according to the identification information that is of Notepad and is obtained by parsing, status information of Notepad in the second terminal with the information about the current reminder 1 in Notepad in the first terminal, or in a case in which it is found that Notepad is not installed in the second terminal, installs Notepad in the second terminal according to the identification information of Notepad and starts Notepad, and synchronizes, according to the identification information that is of Notepad and is obtained by parsing, status information of Notepad in the second terminal with the information about the current reminder 1 in Notepad in the first terminal. Therefore, this resolves a problem in the prior art that an entire process of implementing application information sharing includes more steps that involve manual operations, is cumbersome and time-consuming, and has a limitation, thereby improving application information sharing efficiency. In addition, the method may support compatibility with applications provided by different vendors, thereby implementing application information sharing among the applications provided by different vendors.

Figure 8:
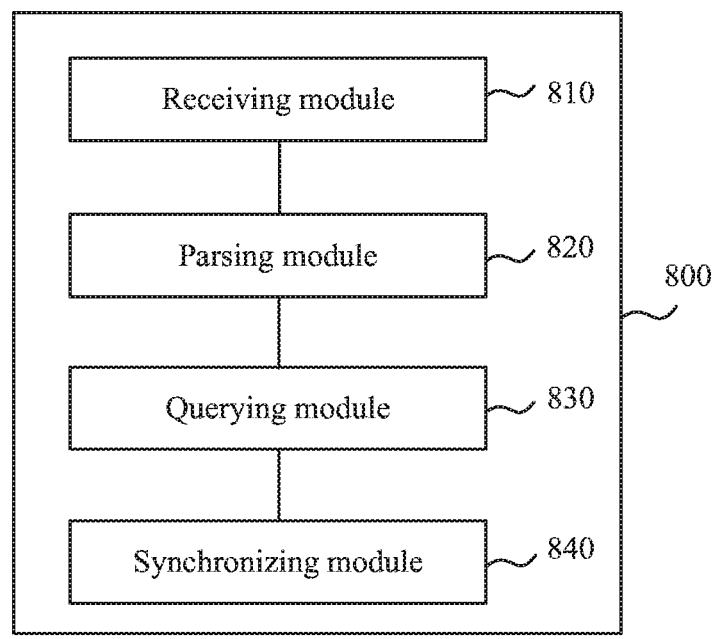
FIG. 8 is a schematic diagram of a structure of an application information sharing apparatus 800 according to Embodiment 8.

FIG. 8 is a schematic diagram of a structure of an application information sharing apparatus 800 according to Embodiment 8. The apparatus in this embodiment is applicable to a case in which unified management on sharing of information about different applications is implemented on a premise that application information sharing efficiency is improved. The apparatus is generally implemented in hardware and/or software manner. With reference to FIG. 8, the apparatus includes the following modules: a receiving module 810, a parsing module 820, a querying module 830, and a synchronizing module 840.

The receiving module 810 is configured to receive, by using Near Field Communication, application information sent by a first terminal, where the application information includes identification information of an application and status information of the application; the parsing module 820 is configured to parse the application information to obtain the identification information of the application and the status information of the application; the querying module 830 is configured to perform a query on the second terminal according to the identification information of the application; and the synchronizing module 840 is configured to: in a case in which it is found that the application is installed in the second terminal, synchronize, according to the status information of the application, status information of the application in the second terminal with the status information of the application in the first terminal.

Further, the synchronizing module 840 is further configured to: in a case in which it is found that the application is not installed in the second terminal, install, according to the identification information of the application, the application in the second terminal, and start the application; and synchronize, according to the status information of the application, the status information of the application in the second terminal with the status information of the application in the first terminal.

Further, the synchronizing module 840 is specifically configured to synchronize, according to the status information of the application, the status information of the application in the second terminal with the status information of the application in the first terminal in a manner of searching for a configuration file of the application and writing the status information of the application into the configuration file that is of the application and is found by the second terminal; or specifically configured to synchronize, according to the status information of the application, the status information of the application in the second terminal with the status information of the application in the first terminal in a manner of writing the status information of the application into a database file of the second terminal.

According to the application information sharing apparatus provided in this embodiment, a second terminal receives, by using Near Field Communication, application information sent by a first terminal, parses the application information to obtain identification information of an application and status information of the application, performs a query on the second terminal according to the identification information of the application, and in a case in which it is found that the application is installed, synchronizes, according to the status information of the application, status information of the application in the second terminal with the status information of the application in the first terminal. Therefore, this resolves a problem in the prior art that an entire process of implementing application information sharing includes more steps that involve manual operations, is cumbersome and time-consuming, and has a limitation, thereby improving application information sharing efficiency.

Figure 9:
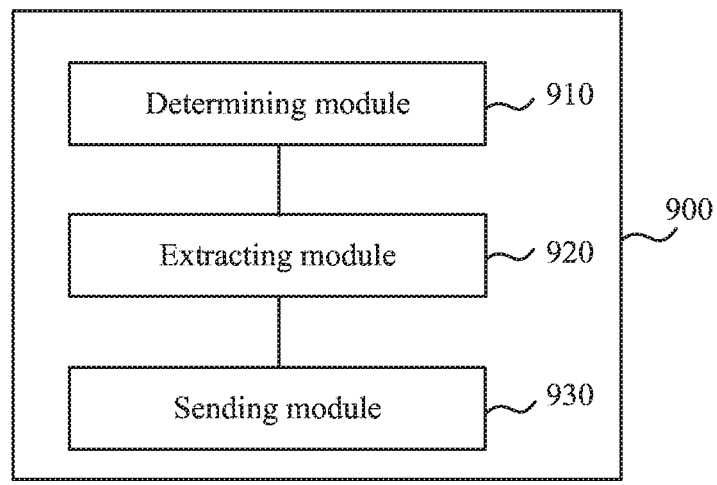
FIG. 9 is a schematic diagram of a structure of an application information sharing apparatus 900 according to Embodiment 9.

FIG. 9 is a schematic diagram of a structure of an application information sharing apparatus 900 according to Embodiment 9. The apparatus in this embodiment is applicable to a case in which unified management on sharing of information about different applications is implemented on a premise that application information sharing efficiency is improved. The apparatus is generally implemented in hardware and/or software manner. With reference to FIG. 9, the apparatus includes the following modules: a determining module 910, an extracting module 920, and a sending module 930.

The determining module 910 is configured to determine, on a first terminal, an application selected by a user from an application list of the first terminal; the extracting module 920 is configured to extract identification information of the application and status information of the application according to the determined application; and the sending module 930 is configured to send application information to a second terminal by using Near Field Communication, where the application information includes the identification information of the application and the status information of the application, so that the second terminal determines, according to the identification information of the application, whether the application is installed in the second terminal, and in a case in which it is determined that the application is installed in the second terminal, the second terminal synchronizes, according to the status information of the application, status information of the application in the second terminal with the status information of the application in the first terminal.

Further, the extracting module 920 is specifically configured to extract the identification information of the application and the status information of the application from a configuration file of the determined application or a database file.

According to the application information sharing apparatus provided in this embodiment, a first terminal determines, on the first terminal, an application selected by a user from an application list of the first terminal, extracts identification information of the application and status information of the application according to the determined application, sends application information to a second terminal by using Near Field Communication, so that the second terminal determines, according to the identification information of the application, whether the application is installed in the second terminal, and in a case in which it is determined that the application is installed in the second terminal, the second terminal synchronizes, according to the status information of the application, status information of the application in the second terminal with the status information of the application in the first terminal. Therefore, this resolves a problem in the prior aft that an entire process of implementing application information sharing includes more steps that involve manual operations, is cumbersome and time-consuming, and has a limitation, thereby improving application information sharing efficiency.

Figure 10:
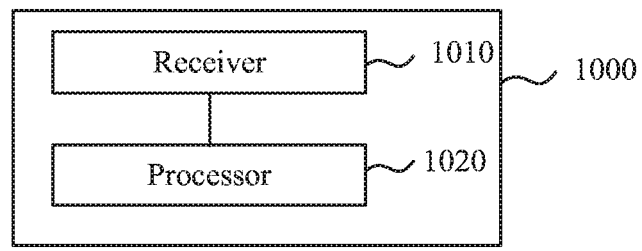
FIG. 10 is a schematic diagram of a structure of an application information sharing apparatus 1000 according to Embodiment 10.

FIG. 10 is a schematic diagram of a structure of an application information sharing apparatus 1000 according to Embodiment 10. With reference to FIG. 10, the apparatus includes a receiver 1010 and a processor 1020.

The receiver 1010 is configured to receive, by using Near Field Communication, application information sent by a first terminal, where the application information includes identification information of an application and status information of the application. The processor 1020 is configured to: parse the application information to obtain the identification information of the application and the status information of the application; perform a query on a second terminal according to the identification information of the application; and in a case in which it is found that the application is installed in the second terminal, synchronize, according to the status information of the application, status information of the application in the second terminal with the status information of the application in the first terminal.

Further, the processor 1020 is further configured to: in a case in which it is found that the application is not installed in the second terminal, install the application in the second terminal according to the identification information of the application, and start the application; and synchronize, according to the status information of the application, the status information of the application in the second terminal with the status information of the application in the first terminal.

Further, the processor 1020 is specifically configured to synchronize, according to the status information of the application, the status information of the application in the second terminal with the status information of the application in the first terminal in a manner of searching for a configuration file of the application and writing the status information of the application into the configuration file that is of the application and is found by the second terminal; or is specifically configured to synchronize, according to the status information of the application, the status information of the application in the second terminal with the status information of the application in the first terminal in a manner of writing the status information of the application into a database file of the second terminal.

According to the application information sharing apparatus provided in this embodiment, a second terminal receives, by using Near Field Communication, application information sent by a first terminal, parses the application information to obtain identification information of an application and status information of the application, performs a query on the second terminal according to the identification information of the application, and in a case in which it is found that the application is installed, synchronizes, according to the status information of the application, status information of the application in the second terminal with the status information of the application in the first terminal. Therefore, this solves a problem in the prior art that an entire process of implementing application information sharing includes more steps that involve manual operations, is cumbersome and time-consuming, and has a limitation, thereby improving application information sharing efficiency.

Figure 11:
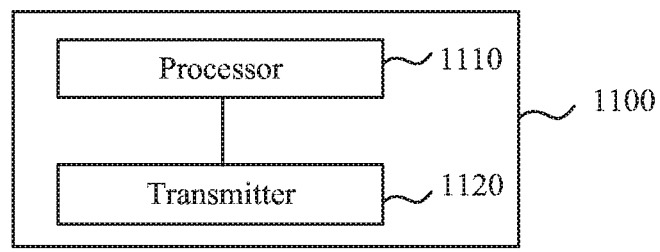
FIG. 11 is a schematic diagram of a structure of an application information sharing apparatus 1100 according to Embodiment 11.

FIG. 11 is a schematic diagram of a structure of an application information sharing apparatus 1100 according to Embodiment 11. With reference to FIG. 11, the apparatus includes a processor 1110 and a transmitter 1120.

The processor 1110 is configured to: determine, on a first terminal, an application selected by a user from an application list of the first terminal; and extract identification information of the application and status information of the application according to the determined application. The transmitter 1120 is configured to send application information to a second terminal by using Near Field Communication, where the application information includes the identification information of the application and the status information of the application, so that the second terminal determines, according to the identification information of the application, whether the application is installed in the second terminal, and in a case in which it is determined that the application is installed in the second terminal, the second terminal synchronizes, according to the status information of the application, status information of the application in the second terminal with the status information of the application in the first terminal.

Further, the processor 1110 is specifically configured to extract the identification information of the application and the status information of the application from a configuration file of the determined application or a database file.

According to the application information sharing apparatus provided in this embodiment, a first terminal determines, on the first terminal, an application selected by a user from an application list of the first terminal, extracts identification information of the application and status information of the application according to the determined application, sends application information to a second terminal by using Near Field Communication, so that the second terminal determines, according to the identification information of the application, whether the application is installed in the second terminal, and in a case in which it is determined that the application is installed in the second terminal, the second terminal synchronizes, according to the status information of the application, status information of the application in the second terminal with the status information of the application in the first terminal. Therefore, this resolves a problem in the prior aft that an entire process of implementing application information sharing includes more steps that involve manual operations, is cumbersome and time-consuming, and has a limitation, thereby improving application information sharing efficiency.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read only memory (ROM), a random access memory (RAM), a magnetic disk, or an optical disc.

Finally, it should be noted that the foregoing embodiments are merely intended for describing the technical solutions of embodiments, but not for limiting the embodiments. Although the embodiments are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments.

What is claimed is:

1. A method comprising:
receiving, by a second terminal using Near Field Communication, application information sent by a first terminal in response to a first application in the first terminal being selected by a first user from an application list, wherein the application list is a shared application list comprising one or more applications selectable by the first user as a shared application, and wherein the application information comprises identification information of the first application in the first terminal and status information of the first application in the first terminal, wherein the status information of the first application in the first terminal is current running status information of the first application in the first terminal, wherein the current running status information indicates the first application is running in the first terminal, and wherein the current running status information further indicates data being processed by the first application while the first application is running, and further indicates a processing state of the data in the first application, wherein the first application is one of a text editor, an address book, or a browser, wherein the current running status information is currently recorded text information when the first application is the text editor, wherein, when the first application is the address book, the current running status information is current information about a contact selected from the address book, and wherein, when the first application is the browser, the current running status information is current web page link information of a currently browsed web page and position information of the currently browsed web page;
parsing, by the second terminal, the application information to obtain the identification information of the first application in the first terminal and the status information of the first application in the first terminal;
performing, by the second terminal, a query on the second terminal for a second application corresponding to the first application being installed on the second terminal according to the identification information;
displaying, by the second terminal to a second user of the second terminal, in response to the query indicating that the second application is installed on the second terminal, an icon representing the second application in a search result list;
providing, according to the first application and in response to the second application not being installed on the second terminal, the second user of the second terminal with a first display interface having a prompt indicating that an application that is the same as the first application specified by the first terminal in the application information as being installed on the first terminal is not found installed on the second terminal and permitting the second user to select between authorizing adding the second application to the second terminal and discarding the application information;
installing, by the second terminal, according to the identification information, and in response to the second user authorizing adding the second application to the second terminal, the second application to the second terminal, and starting the second application in the second terminal after the installing;
displaying, by the second terminal to the second user of the second terminal, in response to completion of the installation of the second application on the second terminal, the icon representing the second application in a list of applications installed on the second terminal; and
synchronizing, by the second terminal, in response to the second application in the second terminal corresponding to the identification information being installed in the second terminal, status information of the second application in the second terminal with the status information of the first application in the first terminal, wherein the synchronizing comprises running the second application in the second terminal and processing the data, by the second application, to achieve the processing state of the data in the second application, and further comprises writing the status information of the first application in the first terminal into a database file of the second terminal.

2. The method according to claim 1, wherein synchronizing, by the second terminal according to the status information of the first application in the first terminal, the status information of the second application in the second terminal with the status information of the first application in the first terminal comprises:
synchronizing, by the second terminal according to the status information of the first application in the first terminal, the status information of the second application in the second terminal with the status information of the first application in the first terminal in a manner of searching for a configuration file of the second application in the second terminal and writing the status information of the first application in the first terminal into the configuration file of the second application in the second terminal.

3. The method according to claim 1, wherein the identification information is a serial number of the first application in the first terminal.

4. The method according to claim 1, wherein the identification information is a message digest algorithm (md5) value of the first application.

5. The method according to claim 1, the first application is selected by the first user from a drop-down menu comprising the shared application list.

6. The method according to claim 1, further comprising providing, to the second user, in response to the second application being installed on the second terminal and before performing the synchronizing, a second display interface showing that the second application was found installed on the second terminal;
wherein the installing and starting the second application in the second terminal comprises:
installing, by the second terminal, according to the identification information, and in response to the second user authorizing adding the second application to the second terminal, the second application to the second terminal;
providing, to the second user, in response to the second application being installed on the second terminal and before the starting the second application, a third display interface showing that the second application was successfully installed on the second terminal; and
starting the second application in the second terminal after the installing.

7. A method comprising:
determining, by a first terminal, a first application in the first terminal selected by a first user from an application list of the first terminal, wherein the application list is a shared application list comprising one or more applications selectable by the first user as a shared application;
extracting, by the first terminal, identification information of the first application in the first terminal and status information of the first application in the first terminal according to the determined application, wherein the status information of the first application in the first terminal is current running status information of the first application in the first terminal, wherein the current running status information indicates the first application is running in the first terminal, wherein the current running status information further indicates data being processed by the first application while the first application is running, and further indicates a processing state of the data in the first application, wherein the first application is one of a text editor, an address book, or a browser, wherein the current running status information is currently recorded text information when the first application is the text editor, wherein, when the first application is the address book, the current running status information is current information about a contact selected from the address book, and wherein, when the first application is the browser, the current running status information is current web page link information of a currently browsed web page and position information of the currently browsed web page; and
sending, by the first terminal to a second terminal, application information using Near Field Communication, wherein the application information comprises the identification information and the status information of the first application in the first terminal, so that the second terminal can determine, according to the identification information, whether a second application corresponding to the first application in the first terminal is installed in the second terminal, so that the second terminal can display, to a second user of the second terminal, in response to the second terminal determining that the second application is installed on the second terminal, an icon representing the second application in a search result list, so that the second terminal can further provide, according to the first application, and in response to the second application not being installed on the second terminal, the second user of the second terminal with a first display interface having a prompt indicating that an application that is the same as the first application specified by the first terminal in the application information as being installed on the first terminal is not found installed on the second terminal and permitting the second user to authorize adding the second application to the second terminal or discard the application information, so the second terminal can install, according to the identification information, and in response to the second user authorizing adding the second application to the second terminal, the second application to the second terminal and so that the second terminal can further display, to the second user of the second terminal, in response to completion of the installation of the second application on the second terminal, the icon representing the second application in a list of applications installed on the second terminal and start the second application in the second terminal after the installing, and so the second terminal can synchronize, according to the status information, in response to the second application being installed in the second terminal, status information of the second application in the second terminal with the status information of the first application in the first terminal, wherein synchronizing the status information of the second application comprises running the second application in the second terminal and processing the data, by the second application, to achieve the processing state of the data in the second application, and further comprises writing the status information of the first application in the first terminal into a database file of the second terminal.

8. The method according to claim 7, wherein extracting, by the first terminal, the identification information of the first application in the first terminal and the status information of the first application in the first terminal according to the determined application comprises:
extracting, by the first terminal, the identification information and the status information of the first application in the first terminal from a configuration file of the determined application or a database file.

9. The method according to claim 7, wherein the identification information is at least one of a name of the first application in the first terminal, a serial number of the first application in the first terminal, or a message digest algorithm (md5) value of the first application in the first terminal.

10. An apparatus, comprising:
a processor; and
a non-transitory computer readable storage medium storing a program for execution by the processor, the program including instructions to:
receive, using Near Field Communication, application information sent by a first terminal in response to a first application in the first terminal being selected by a first user at the first terminal from an application list, wherein the application list is a shared application list comprising one or more applications selectable by the first user as a shared application, wherein the application information comprises identification information of the first application in the first terminal and status information of the first application in the first terminal, wherein the status information of the first application in the first terminal is current running status information of the first application in the first terminal, wherein the current running status information indicates the first application is running in the first terminal, and wherein the current running status information further indicates data being processed by the first application while the first application is running, and further indicates a processing state of the data in the first application, wherein the first application is one of a text editor, an address book, or a browser, wherein the current running status information is currently recorded text information when the first application is the text editor, wherein, when the first application is the address book, the current running status information is current information about a contact selected from the address book, and wherein, when the first application is the browser, the current running status information is current web page link information of a currently browsed web page and position information of the currently browsed web page;

parse the application information to obtain the identification information of the first application in the first terminal and the status information of the first application in the first terminal;

perform a query for a second application corresponding to the first application being installed on the apparatus according to the identification information;

display, to a second user of the apparatus, in response to the query indicating that the second application is installed on the apparatus, an icon representing the second application in a search result list;

provide, according to the first application, in response to the second application not being installed on the apparatus, the second user of the apparatus with a first display interface having a prompt indicating that an application that is the same as the first application specified by the first terminal in the application information as being installed on the first terminal is not found installed on the apparatus and permitting the second user to select between authorizing adding the second application to the apparatus and discarding the application information;

install, according to the identification information, and in response to the second user authorizing adding the second application to the apparatus, the second application to the apparatus, and start the second application in the apparatus after installing the second application;

display, to the second user of the apparatus, in response to completion of the installation of the second application on the apparatus, the icon representing the second application in a list of applications installed on the apparatus; and synchronize, in response to the second application in the apparatus corresponding the identification information being installed in the apparatus, status information of the second application in the apparatus with the status information of the first application in the first terminal, wherein the instructions to synchronize the status information of the second application include instructions to run the second application and process the data, by the second application, to achieve the processing state of the data in the second application, and further include instructions to write the status information of the first application in the first terminal into a database file of the apparatus.

11. The apparatus according to claim 10, wherein the identification information is at least one of a name of the first application in the first terminal, a serial number of the first application in the first terminal, or a message digest algorithm (md5) value of the first application in the first terminal.

12. The apparatus according to claim 10, wherein the instructions further comprise instructions to:

provide, to the second user, in response to the second application being installed on the apparatus and before performing the synchronizing, a second display interface showing that the second application was found installed on the apparatus;

wherein the instructions to install and start the second application in the apparatus comprises:

install, according to the identification information, and in response to the second user authorizing adding the second application to the apparatus, the second application to the apparatus;

provide, to the second user, in response to the second application being installed on the apparatus and before the starting the second application, a third display interface showing that the second application was successfully installed on the apparatus; and start the second application after the installing.

13. An apparatus comprising:

a processor; and a non-transitory computer readable storage medium storing a program for execution by the processor, the program including instructions to:

determine, on the apparatus, a first application selected by a first user from an application list of the apparatus, wherein the application list is a shared application list comprising one or more applications selectable by the first user as a shared application;

extract identification information of the first application and status information of the first application according to the first application, wherein the status information of the first application is current running status information of the first application, wherein the current running status information indicates the first application is running in the apparatus, and wherein the current running status information further indicates data being processed by the first application while the first application is running, and further indicates a processing state of the data in the first application, wherein the first application is one of a text editor, an address book, or a browser, wherein the current running status information is currently recorded text information when the first application is the text editor, wherein, when the first application is the address book, the current running status information is current information about a contact selected from the address book, and wherein, when the first application is the browser, the current running status information is current web page link information of a currently browsed web page and position information of the currently browsed web page; and send application information to a second terminal using Near Field Communication, wherein the application information comprises the identification information of the first application and the status information of the first application, so that the second terminal can determine, according to the identification information, whether a second application corresponding to the first application is installed in the second terminal, so that the second terminal can display, to a second user of the second terminal, in response to the second terminal determining that the second application is installed on the second terminal, an icon representing the second application in a search result list, so the second terminal can further provide, according to the first application and in response to the second application not being installed on the second terminal, the second user of the second terminal with a first display interface having a prompt indicating that an application that is the same as the first application specified by the first terminal in the application information as being installed on the first terminal is not found installed on the second terminal and permitting the second user to authorize adding the second application to the second terminal or discard the application information, so the second terminal can install, according to the identification information, and in response to the second user authorizing adding the second application to the second terminal, the second application to the second terminal and so that the second terminal can further display, to the second user of the second terminal, in response to completion of the installation of the second application on the second terminal, the icon representing the second application in a list of applications installed on the second terminal and start the second application in the second terminal after the installing, and so the second terminal can synchronize, in response to determining the second application is installed in the second terminal, status information of the second application in the second terminal with the status information of the first application, wherein synchronizing by the second terminal comprises running the second application in the second terminal and processing the data, by the second application, to achieve the processing state of the data in the second application, and wherein the second terminal synchronizing the status information comprises the second terminal writing the status information of the first application in the first terminal into a database file of the second terminal.

14. The apparatus according to claim 13, wherein the instructions further comprise instructions to extract the identification information of the first application and the status information of the first application from a configuration file of the determined application or a database file.

* * * * *